(12) United States Patent
Murata et al.

(10) Patent No.: US 11,211,088 B2
(45) Date of Patent: *Dec. 28, 2021

(54) MAGNETIC DISC, ALUMINUM ALLOY SUBSTRATE FOR MAGNETIC DISC, AND PRODUCTION METHOD FOR ALUMINUM ALLOY SUBSTRATE

(71) Applicants: UACJ CORPORATION, Tokyo (JP); FURUKAWA ELECTRIC CO., LTD., Tokyo (JP)

(72) Inventors: Takuya Murata, Tokyo (JP); Kotaro Kitawaki, Tokyo (JP); Makoto Yonemitsu, Tokyo (JP); Hideyuki Hatakeyama, Tokyo (JP); Takashi Nakayama, Tokyo (JP); Ryo Sakamoto, Tokyo (JP); Hiroki Ota, Tokyo (JP)

(73) Assignees: UACJ CORPORATION, Tokyo (JP); FURUKAWA ELECTRIC CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/971,860

(22) PCT Filed: Nov. 28, 2018

(86) PCT No.: PCT/JP2018/043880
§ 371 (c)(1),
(2) Date: Aug. 21, 2020

(87) PCT Pub. No.: WO2019/163239
PCT Pub. Date: Aug. 29, 2019

(65) Prior Publication Data
US 2021/0012801 A1 Jan. 14, 2021

(30) Foreign Application Priority Data
Feb. 23, 2018 (JP) .............................. JP2018-030238

(51) Int. Cl.
*C22C 21/00* (2006.01)
*G11B 5/73* (2006.01)
(Continued)

(52) U.S. Cl.
CPC .......... *G11B 5/73919* (2019.05); *C22C 21/00* (2013.01); *C22F 1/04* (2013.01);
(Continued)

(58) Field of Classification Search
CPC ......... C22C 21/06; C22C 21/08; C22F 1/047; G11B 5/73; G11B 5/7315; G11B 5/73919; G11B 5/8404
(Continued)

(56) References Cited

U.S. PATENT DOCUMENTS 10,767,247 B2 * 9/2020 Murata ................... C22C 21/00
2017/0327930 A1 11/2017 Kitawaki et al.
(Continued)

FOREIGN PATENT DOCUMENTS

| CN | 107109543 A | 8/2017 |
| CN | 107532245 A | 1/2018 |

(Continued)

OTHER PUBLICATIONS

ISR issued in Intl. Application No. PCT/JP2018/043880, mailed Feb. 19, 2019.
(Continued)

*Primary Examiner* — Jie Yang
(74) *Attorney, Agent, or Firm* — Greer, Burns & Crain, Ltd.

(57) ABSTRACT

Provided are a magnetic disk and a method of fabricating the magnetic disk. The magnetic disk includes an aluminum alloy plate fabricated by a process involving a CC method and a compound removal process, and an electroless Ni—P plating layer disposed on the surface of the plate. The
(Continued)

aluminum alloy plate is composed of an aluminum alloy containing 0.4 to 3.0 mass % (hereinafter abbreviated simply as "%") of Fe, 0.1% to 3.0% of Mn, 0.005% to 1.000% of Cu, 0.005% to 1.000% of Zn, with a balance of Al and unavoidable impurities. In the magnetic disk, the maximum amplitude of waviness in a wavelength range of 0.4 to 5.0 mm is 5 nm or less, and the maximum amplitude of waviness in a wavelength range of 0.08 to 0.45 mm is 1.5 nm or less.

6 Claims, 2 Drawing Sheets

(51) Int. Cl.
    *C22F 1/04*     (2006.01)
    *C23C 18/16*     (2006.01)
    *C23C 18/50*     (2006.01)
    *G11B 5/858*     (2006.01)

(52) U.S. Cl.
    CPC .......... *C23C 18/1637* (2013.01); *C23C 18/50* (2013.01); *G11B 5/858* (2013.01)

(58) Field of Classification Search
    USPC ........................................................ 420/553
    See application file for complete search history.

(56) References Cited

U.S. PATENT DOCUMENTS

| | | |
|---|---|---|
| 2018/0190316 A1 | 7/2018 | Kitawaki et al. |
| 2018/0221928 A1 | 8/2018 | Kitawaki et al. |
| 2019/0066724 A1 * | 2/2019 | Nakamura .............. C22C 21/00 |
| 2019/0390304 A1 | 12/2019 | Murata et al. |

FOREIGN PATENT DOCUMENTS

| | | | |
|---|---|---|---|
| CN | 110234794 A | 9/2019 | |
| JP | 60014785 B | 4/1985 | |
| JP | 02205651 A | 8/1990 | |
| JP | 05247659 A | 9/1993 | |
| JP | 2000105915 A | 4/2000 | |
| JP | 2005310376 A | 11/2005 | |
| JP | 2009279696 A | 12/2009 | |
| JP | 2017031507 A | 2/2017 | |
| WO | 2016068293 A1 | 5/2016 | |
| WO | WO-2016190277 A1 * | 12/2016 | ........... G11B 5/8404 |
| WO | 2017188320 A1 | 11/2017 | |
| WO | 2017188320 A1 | 5/2018 | |

OTHER PUBLICATIONS

Written Opinion of the ISA, dated Feb. 19, 2019 (with machine translation).
Office Action dated May 26, 2021 in the corresponding CN patent application No. 201880090121.6, and English translation.

* cited by examiner

MAGNETIC DISC, ALUMINUM ALLOY SUBSTRATE FOR MAGNETIC DISC, AND PRODUCTION METHOD FOR ALUMINUM ALLOY SUBSTRATE

This is a National Phase Application filed under 35 U.S.C. § 371, of International Application No. PCT/JP2018/030238, filed Feb. 23, 2018, the contents of which are incorporated by reference.

TECHNICAL FIELD

The present disclosure relates to a magnetic disk and an aluminum alloy substrate for the magnetic disk. Specifically, the disclosure relates to an aluminum alloy magnetic disk having a high strength and a low level of waviness and causing a low level of disk fluttering, and relates to an aluminum alloy substrate constituting the magnetic disk and a method of fabricating the substrate.

BACKGROUND ART

Aluminum alloy magnetic disks have been used as magnetic disks for computers and data centers. Aluminum alloy substrates constituting these magnetic disks are composed of aluminum alloys having preferable plating characteristics and excellent mechanical characteristics and processability. A typical example of these aluminum alloys is the JIS 5086 aluminum alloy (aluminum alloy containing 3.5 to 4.5 mass % of Mg, 0.50 mass % or less of Fe, 0.40 mass % or less of Si, 0.20 to 0.70 mass % of Mn, 0.05 to 0.25 mass % of Cr, 0.10 mass % or less of Cu, 0.15 mass % or less of Ti, 0.25 mass % of Zn, with a balance of Al and unavoidable impurities). This alloy is used to fabricate aluminum alloy substrates.

A general aluminum alloy magnetic disk is fabricated by preparing an annular aluminum alloy substrate, plating this aluminum alloy substrate, and then spattering a magnetic material on the substrate surface.

A typical aluminum alloy substrate for a magnetic disk is fabricated by the method explained below. The explanation is directed to a method of fabricating an aluminum alloy substrate composed of the JIS 5086 alloy in the above example.

First, an aluminum alloy having a desired chemical composition is cast into a plate. This cast plate is homogenized and then hot rolled. This plate is then cold rolled to produce a rolled plate having a thickness required as a magnetic disk. This rolled plate should preferably be annealed as required, for example, during the cold rolling. Then, the rolled plate is punched into an annular shape and is subject to pressure annealing to remove stress and the like caused in the preceding steps. The pressure annealing is a process of stacking annular aluminum alloy plates produced by punching on each other and annealing the plates while pressurizing the upper and lower surfaces to flatten the plates. This pressure annealing yields an aluminum alloy disk blank having an annular shape.

The resulting disk blank receives a pretreatment and a base treatment and is provided with a magnetic medium composed of layers, such as a magnetic layer, to produce a magnetic disk. The pretreatment involves cutting, grinding, degreasing, etching, desmutting, and zincate treatments (Zn substitution) in sequence. The base treatment following the pretreatment involves electroless plating of Ni—P, which is a hard non-magnetic metal, and then polishing and smoothing of the plated surface. The smoothed substrate surface is provided with a magnetic material by spattering, for example, thereby completing an aluminum alloy magnetic disk.

In recent years, the situation around storage devices, such as HDDs, to which magnetic disks are applied, has been changing more drastically than ever. The changes in situation include the expansion of capacities of data centers accompanied by development of cloud services and the introduction of new storage devices called SSDs. The SSDs are advantageous in high shock and heat resistances, rapid reading operations, and the like. Accordingly, more and more HDDs have been replaced with SSDs as the storage devices of data centers. The HDDs are therefore required to be improved in speed to survive in the future, in addition to improvements in capacity and density, which are advantages of HDDs.

The most effective procedure for expanding the capacity of an HDD is increasing the number of magnetic disks installable in a single storage device. In order to increase the number of installable magnetic disks, an aluminum alloy substrate for each magnetic disk must have a smaller thickness. Unfortunately, such a thin substrate has a lower rigidity and is readily deformed. In addition, in a high-speed HDD, large fluid forces generated by rotation increase exciting forces, so that the substrate having a lower rigidity suffers from disk fluttering.

The disk fluttering occurs due to vibration (fluttering) of magnetic disks. The fluttering is caused by unstable airflows generated between the rapidly rotating magnetic disks. An aluminum alloy substrate having a lower rigidity provides a larger displacement caused by the fluttering, so that a head, which is a reading unit, cannot readily follow the displacement. These disk fluttering increases the frequency of errors in positioning of the head. Strongly desired are a substrate and a magnetic disk causing reduced fluttering and having a small displacement (low level of fluttering characteristics).

A conceivable solution to the problem of disk fluttering is use of substrates other than the aluminum alloy substrate. A glass substrate can also be applied to a magnetic disk as well as the aluminum alloy substrate. The glass substrate has been known to cause a lower level of fluttering than that of the aluminum alloy substrate. The aluminum alloy substrate can therefore be possibly replaced with the glass substrate in the future. That is, the viability of the aluminum alloy substrate for a magnetic disk is being threatened by both of the above-described changes in situation around HDDs and the existence of the glass substrate.

Besides the advantage of the glass substrate in fluttering characteristics, the aluminum alloy substrate is nevertheless superior. The aluminum alloy substrate can be fabricated at lower costs than the glass substrate and therefore is still in high demand. In addition, the aluminum alloy substrate has potential to be further improved in fluttering characteristics by adjusting the composition of the aluminum alloy constituting the substrate, varying the fabrication method, and the like.

Existing techniques related to improvements in the constituent materials of an aluminum alloy substrate for a magnetic disk will now be described. Most of the existing ideas to improve the materials of an aluminum alloy substrate for a magnetic disk are directed to slight adjustment of the composition of a commonly-used aluminum alloy, such as an Al—Mg alloy (for example, the JIS 5086 alloy) (Patent Literature 1). Such slight adjustment of the composition of the aluminum alloy substrate for a magnetic disk has been repeated until now. No replacement of the 5000-series alloy with other alloy has been attempted in a product.

Unfortunately, such an improvement only at a level of slight adjustment of the composition is not expected to significantly increase the strength of the aluminum alloy substrate or reduce disk fluttering. In particular, the substrate having a reduced thickness to expand the capacity has limited potential to be improved by the existing procedures. Against this problem of disk fluttering, Patent Literature 2 discloses an aluminum alloy substrate having a composition containing a relatively large amount of Si in comparison to existing aluminum alloy substrates, for example.

CITATION LIST

Patent Literature

Patent Literature 1: Unexamined Japanese Patent Application Kokai Publication No. H02-205651
Patent Literature 2: Japanese Patent No. 6014785

SUMMARY OF INVENTION

Technical Problem

An effective procedure to increase the strength of an aluminum alloy substrate and thus reduce disk fluttering is distribution of compound particles in the aluminum alloy. Based on this idea, the aluminum alloy substrate disclosed in Patent Literature 2 is composed of an alloy having a high Si content and has a high rigidity ensured by deposition of Si particles. Unfortunately, the aluminum alloy substrate disclosed in Patent Literature 2 cannot be readily ground because of the high Si content. In addition, the Si particles on the substrate surface may increase the surface deficiencies after the electroless Ni—P plating, thereby causing a problem of waviness of the substrate surface.

The surface waviness of the magnetic disk substrate is severely problematic in development of high-speed HDDs, even if the waviness is a low level in the order of nanometers. In an HDD, the distance between a head that reads and writes data and the magnetic disk surface is only several nanometers to several tens of nanometers. In the case of a high level of waviness of the disk surface, the distance between the head and the disk surface varies and thus causes fluctuations in output, leading to unstable reading and writing operations and calculation delays. That is, the high level of waviness inhibits development of high-speed HDDs.

The waviness of the aluminum alloy substrate for a magnetic disk is generated due to surface deficiencies on the substrate after electroless Ni—P plating. That is, a substrate composed of an aluminum alloy in which compound particles (for example, Si particles) are distributed, such as the aluminum alloy substrate disclosed in Patent Literature 2, may have a high level of waviness due to the compound particles on the surface.

As described above, development of a substrate having a high strength and a low level of surface waviness and causing a low level of disk fluttering, is an urgent necessity in order to increase the capacity, density, and speed of a magnetic disk.

The requirement for increasing the strength aimed at reduction in disk fluttering and the requirement for reducing deficiencies on the electroless Ni—P plated surface aimed at reduction in level of waviness are mutually contradictory but must be simultaneously satisfied. The reason for this contradiction is that the compound particles dispersed in the aluminum alloy increase the rigidity but may also increase the level of waviness, as described above.

An object of the disclosure, which has been accomplished in view of the above situation, is to provide an aluminum alloy magnetic disk having a high strength and a low level of waviness and causing a low level of disk fluttering and an aluminum alloy substrate constituting the magnetic disk. Also disclosed is an improved method of fabricating the aluminum alloy substrate, because an improvement in the fabrication method is effective for the above problems, in particular, the problem of waviness, as well as an improvement in the materials of the aluminum alloy substrate.

Solution to Problem

The inventors have carried out studies on reduction in disk fluttering of an aluminum alloy magnetic disk. As a result, the inventors have conceived of an Al—Fe alloy that contains Fe as a constituent material to increase the strength of an aluminum alloy substrate. In the aluminum alloy substrate composed of the Al—Fe alloy achieved by the inventors, second phase particles (compound particles, such as Al—Fe compound particles) based on Fe are distributed and bring about effects of improving the strength and fluttering characteristics of the substrate. That is, the inventors have improved the materials of the aluminum alloy in the same manner as Patent Literature 2 in terms of distributing compound particles (second phase particles) in the aluminum alloy to reduce fluttering.

The compound particles (second phase particles) in the alloy, however, may cause deficiencies on the electroless Ni—P plated surface of the substrate. This phenomenon may be problematic also in an aluminum alloy substrate composed of an Al—Fe alloy. The inventors have carried out further studies and confirmed that the surface state of such an aluminum alloy substrate composed of an Al—Fe alloy can be optimized by some improvements in the fabrication method and the resulting aluminum alloy substrate has a high strength and thus causes a low level of fluttering, and has no deficiencies after electroless Ni—P plating.

As a result of the above-described studies, the inventors have created an aluminum alloy magnetic disk and an aluminum alloy substrate having substantially ideal properties (a low level of disk fluttering and a low level of waviness) to satisfy requirements accompanied by expansion of capacity and increase in speed, and thus completed the disclosure.

In a magnetic disk according to a first aspect of the disclosure that achieves the above objective, a maximum amplitude of waviness in a wavelength range of 0.4 to 5.0 mm is 5.0 nm or less, and a maximum amplitude of waviness in a wavelength range of 0.08 to 0.45 mm is 1.5 nm or less on a surface of the magnetic disk.

In the magnetic disk, a level of fluttering characteristics at a frequency of 100 Hz or more may be 200 nm or less.

An aluminum alloy substrate for a magnetic disk according to a second aspect of the disclosure, which is applied to the above-described magnetic disk, includes an aluminum alloy provided with electroless Ni—P plating. A maximum amplitude of waviness in a wavelength range of 0.4 to 5.0 mm is 5.0 nm or less, and a maximum amplitude of waviness in a wavelength range of 0.08 to 0.45 mm is 1.5 nm or less on a surface of the aluminum alloy substrate. A yield stress after retention at 300° C. for three hours is 100 MPa or more. A level of fluttering characteristics at a frequency of 100 Hz or more may be 200 nm or less.

In this aluminum alloy substrate, the aluminum alloy may contain: 0.4 to 3.0 mass % of Fe, 0.1 to 3.0 mass % of Mn, 0.005 to 1.0 mass % of Cu, and 0.005 to 1.0 mass % of Zn, with a balance of Al and unavoidable impurities.

The aluminum alloy may further contain one or more elements selected from a group comprising 0.1 to 0.4 mass % of Si, 0.1 to 3.0 mass % of Ni, 0.1 to 6.0 mass % of Mg, 0.01 to 1.00 mass % of Cr, and 0.01 to 1.00 mass % of Zr.

The aluminum alloy may further contain one or more elements selected from a group comprising Ti, B, and V at a total content of 0.005 to 0.5 mass %.

A method of fabricating an aluminum alloy substrate for a magnetic disk according to a third aspect of the disclosure includes: a casting process to produce an aluminum alloy cast plate; a rolling process of cold rolling the aluminum alloy cast plate to produce an aluminum alloy plate; a pressure annealing process of extracting an annular aluminum alloy plate from the aluminum alloy plate and annealing and flattening the annular aluminum alloy plate under a pressure; a substrate preparing process including a grinding step and a stress-relieving heat treatment step in an order mentioned, which is directed to the annular aluminum alloy plate after the pressure annealing process; a plating pretreatment process including an alkaline degreasing step, an acid etching step, and at least one zincate treatment step in an order mentioned, which is directed to the annular aluminum alloy plate after the substrate preparing process; and an electroless Ni—P plating process of providing electroless Ni—P plating to a surface of the annular aluminum alloy plate after the plating pretreatment process. The method further includes a compound removal process at a timing after the grinding step of the substrate preparing process and before a first one of the at least one zincate treatment step of the plating pretreatment process. The casting process involves continuous casting to produce the aluminum alloy cast plate. The compound removal process involves immersion of the annular aluminum alloy plate for 5 to 60 seconds into an $HNO_3/HF$ mixed solution, which is a solution at a temperature of 10° C. to 30° C. having an $HNO_3$ concentration of 10 to 60 mass % and an HF concentration of 10 to 80 g/L.

The method may further include a cutting step before the grinding step of the substrate preparing process.

Advantageous Effects of Invention

The magnetic disk according to the disclosure and the aluminum alloy substrate constituting the magnetic disk have a high strength, cause a low level of disk fluttering, and have a low level of waviness due to reduced deficiencies on the electroless Ni—P plated surface. These properties can achieve a thickness reduction of a magnetic disk, leading to an increase in the number of installable magnetic disks, and achieve an expansion of the capacity of each magnetic disk, thereby contributing to enhancement of the capacity and speed of an HDD.

DESCRIPTION OF EMBODIMENTS

Figure 1:
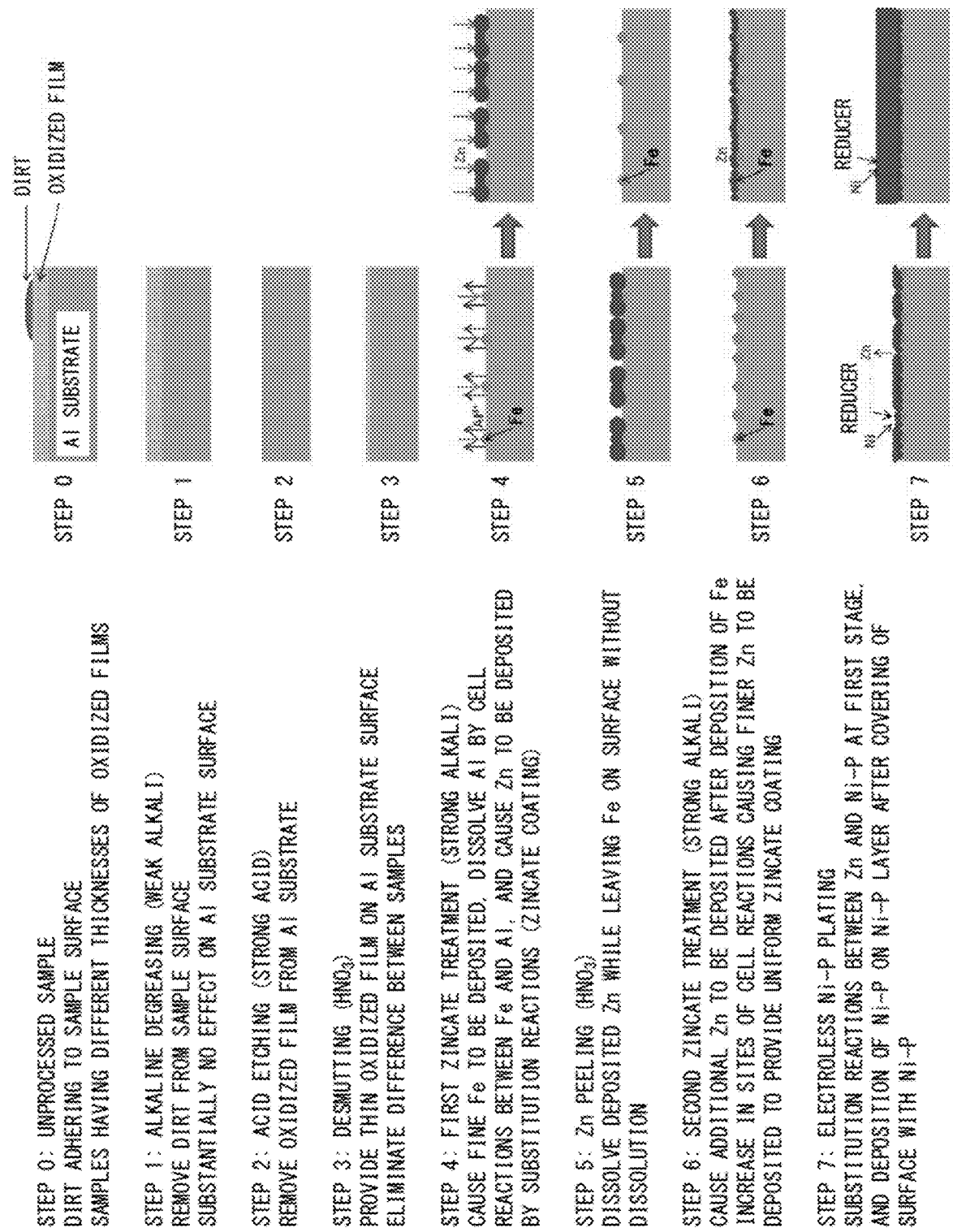
FIG. 1 is a diagram for explaining the steps of a plating pretreatment process and an electroless Ni—P plating process for a magnetic disk substrate composed of an aluminum alloy.

Embodiments of the disclosure will now be described in detail. As described above, a magnetic disk according to the disclosure can be composed of a glass substrate but is advantageous when being composed of an aluminum alloy substrate. This aluminum alloy substrate is composed of an Al—Fe alloy, which may cause generation of compound particles, but the surface state of the aluminum alloy substrate is optimized by the fabrication method. The following description will discus (A) an aluminum alloy substrate according to the disclosure and (B) a method of fabricating the substrate focusing on their configurations and effects with reference to the detailed mechanisms. Based on these discussions, the description is then directed to (C) a magnetic disk according to the disclosure.

A. Aluminum Alloy Substrate for a Magnetic Disk According to the Disclosure

A-1. Composition of an Aluminum Alloy

An aluminum alloy contained in the aluminum alloy substrate according to the disclosure has a composition including essential elements (0.4 to 3.0 mass % of Fe, 0.1 to 3.0 mass % of Mn, 0.005 to 1.000 mass % of Cu, and 0.005 to 1.000 mass % of Zn), with a balance of Al and unavoidable impurities (the unit "mass %" is hereinafter abbreviated as "%"). The aluminum alloy according to the disclosure may further contain one or more optional additive elements selected from a group comprising 0.1% to 0.4% of Si, 0.1% to 3.0% of Ni, 0.1% to 6.0% of Mg, 0.01% to 1.00% of Cr, and 0.01% to 1.00% of Zr (these additive elements may be hereinafter referred to as "first selective elements"). The aluminum alloy according to the disclosure may further contain one or more additive elements selected from a group comprising Ti, B, and V at a total content of 0.005% to 0.5% (these additive elements may be hereinafter referred to as "second selective elements"). The essential elements and the first and second selective elements will now be described.

(i) Essential Additive Elements

Fe: 0.4% to 3.0%

Fe is deposited mainly in the form of second phase particles (for example, Al—Fe compound particles). Fe has effects of improving the strength and the fluttering characteristics of an aluminum alloy substrate. Fe exists partly in the form of a solid solution in the matrix and is capable of improving the strength of the substrate. The second phase particles bring about effects of improving the fluttering characteristics by increasing the strength of the alloy and also by absorbing the vibration energy of fluttering. The effects of improving the fluttering characteristics are provided because a viscous flow at the interface between the second phase particles and the matrix rapidly absorb the vibration energy in response to application of vibration to a magnetic disk substrate.

An Fe content of less than 0.4% cannot achieve sufficient effects of improving the strength or the fluttering characteristics of the magnetic disk substrate. In contrast, an Fe content exceeding 3.0% causes generation of a number of coarse Al—Fe compound particles, which readily cause deficiencies on the electroless Ni—P plated surface. According to the disclosure, compound particles on the surface are removed by a compound removal process to optimize the surface state. This compound removal process can also remove coarse compound particles. It should be noted that the removed coarse compound particles tend to leave excessively large pits, which may impair the smoothness of the electroless Ni—P plated surface and cause peeling of the plating. For these reasons, the Fe content should preferably be within the range of 0.4% to 3.0% and more preferably within the range of 0.8% to 1.8%.

Mn: 0.1% to 3.0%

Mn exists mainly in the form of second phase particles (for example, Al—Mn compound particles). Mn has effects of improving the strength and fluttering characteristics of a magnetic disk substrate. These effects of compound particles are provided by the same mechanisms as the above-described mechanisms of Fe (for example, Al—Fe compound particles).

An Mn content of less than 0.1% cannot achieve sufficient strength or fluttering characteristics of the magnetic disk substrate. In contrast, an Mn content exceeding 3.0% causes generation of a number of coarse Al—Mn compound particles, which may impair the smoothness of the electroless Ni—P plated surface and cause peeling of the plating. For these reasons, the Mn content should preferably be within the range of 0.1% to 3.0% and more preferably within the range of 0.1% to 1.0%.

Cu: 0.005% to 1.000%

Cu exists mainly in the form of second phase particles (for example, Al—Cu compound particles). Cu has effects of improving the strength and fluttering characteristics of a magnetic disk substrate. Cu also has effects of applying a zincate coating in a uniform, thin, and dense manner to improve the smoothness of the electroless Ni—P plated surface.

A Cu content of less than 0.005% cannot achieve sufficient strength or fluttering characteristics of the magnetic disk substrate. This Cu content also leads to a nonuniform zincate coating, thereby impairing the smoothness of the electroless Ni—P plated surface. In contrast, a Cu content exceeding 1.0% causes generation of a number of coarse Al—Cu compound particles, which may impair the smoothness of the electroless Ni—P plated surface and cause peeling of the plating. For these reasons, the Cu content should preferably be within the range of 0.005% to 1.000% and more preferably within the range of 0.005% to 0.400%.

Zn: 0.005% to 1.000%

Zn has effects of applying a zincate coating in a uniform, thin, and dense manner to improve the smoothness and adhesion of the electroless Ni—P plating. Zn forms second phase particles together with other additive elements and thus brings about effects of improving the fluttering characteristics of the magnetic disk substrate.

A Zn content of less than 0.005% leads to a nonuniform zincate coating, thereby impairing the smoothness of the electroless Ni—P plated surface. In contrast, a Zn content exceeding 1.000% makes the electric potential of the matrix far less noble, resulting in a high rate of dissolution of the matrix during a compound removal process and an electroless Ni—P plating process. This phenomenon increases the unevenness of the surface of the aluminum alloy substrate and thus impairs the smoothness of the electroless Ni—P plated surface. For these reasons, the Zn content should preferably be within the range of 0.005% to 1.000% and more preferably within the range of 0.100% to 0.700%.

(ii) First Selective Elements

Si: 0.1% to 0.4%

Si exists mainly in the form of second phase particles (for example, Si particles). Si has effects of improving the strength and fluttering characteristics of a magnetic disk substrate. These effects of compound particles are provided by the same mechanisms as the above-described mechanisms of Fe (for example, Al—Fe compound particles).

An Si content of less than 0.1% cannot achieve sufficient strength or fluttering characteristics of the magnetic disk substrate. In contrast, an Si content exceeding 0.4% causes generation of a number of coarse Si particles, thereby impairing the smoothness of the electroless Ni—P plated surface and causing peeling of the plating. The Si content exceeding 0.4% also impairs the grinding properties due to Al—Si compound particles on the surface. In addition, Al—Si compound particles do not readily cause electrochemical reactions with the matrix and thus tend to remain on the surface even after a compound removal process. For these reasons, the Si content should preferably be within the range of 0.1% to 0.4% and more preferably within the range of 0.1% to 0.3%.

Ni: 0.1% to 3.0%

Ni exists mainly in the form of second phase particles (for example, Al—Ni compound particles). Ni has effects of improving the strength and fluttering characteristics of a magnetic disk substrate. An Ni content of less than 0.1% cannot achieve sufficient strength or fluttering characteristics of the magnetic disk substrate. In contrast, an Ni content exceeding 3.0% causes generation of a number of coarse Al—Ni compound particles. For these reasons, the Ni content should preferably be within the range of 0.1% to 3.0% and more preferably within the range of 0.1% to 1.0%.

Mg: 0.1% to 6.0%

Mg exists mainly in the form of second phase particles (for example, Mg—Si compound particles). Mg has effects of improving the strength and fluttering characteristics of a magnetic disk substrate. An Mg content of less than 0.1% cannot achieve sufficient strength or fluttering characteristics of the magnetic disk substrate. In contrast, an Mg content exceeding 6.0% inhibits rolling of the aluminum alloy. For these reasons, the Mg content should preferably be within the range of 0.1% to 6.0% and more preferably within the range of 0.3% to 1.0%.

Cr: 0.01% to 1.00%

Cr exists mainly in the form of second phase particles (for example, Al—Cr compound particles). Cr has effects of improving the strength and fluttering characteristics of a magnetic disk substrate. A Cr content of less than 0.01% cannot achieve sufficient strength or fluttering characteristics of the magnetic disk substrate. In contrast, a Cr content exceeding 1.00% causes generation of a number of coarse Al—Cr compound particles. For these reasons, the Cr content should preferably be within the range of 0.01% to 1.00% and more preferably within the range of 0.10% to 0.50%.

Zr: 0.01% to 1.00%

Zr exists mainly in the form of second phase particles (for example, Al—Zr compound particles). Zr has effects of improving the strength and fluttering characteristics of a magnetic disk substrate. A Zr content of less than 0.01% cannot achieve sufficient strength or fluttering characteristics of the magnetic disk substrate. In contrast, a Zr content exceeding 1.00% causes generation of a number of coarse Al—Zr compound particles. For these reasons, the Zr content should preferably be within the range of 0.01% to 1.00% and more preferably within the range of 0.10% to 0.50%.

(iii) Second Selective Elements

Ti, B, and V: 0.005% to 0.500% in Total

Ti, B, and V form second phase particles (for example, particles of boride, such as $TiB_2$, or $Al_3Ti$ or Ti—V—B) during a solidification process of casting, which serve as nuclei of crystal grains, and can thus produce finer crystal grains. These finer crystal grains increase the size uniformity of the second phase particles, thereby reducing the variations in the strength and fluttering characteristics of magnetic disk substrates.

These effects cannot be achieved at a total content of Ti, B, and V of less than 0.005%. In contrast, the effects are saturated and not significantly enhanced at a total content of Ti, B, and V exceeding 0.500%. For these reasons, the total content of Ti, B, and V should preferably be within the range of 0.005% to 0.500% and more preferably within the range of 0.005% to 0.100%. It should be noted that the total content of Ti, B, and V indicates the sum of the amounts of three elements for the alloy containing all the three elements, the sum of the amounts of two elements for the alloy containing only the two elements, and the amount of one element for the alloy containing only the one element.

Other Elements

The rest of the aluminum alloy contained in the aluminum alloy substrate according to the disclosure is composed of Al and unavoidable impurities. Examples of the unavoidable impurities include Sr, Pb, Ga, and Sn. If the content of each element is less than 0.1% and if the total content is less than 0.2%, the unavoidable impurities do not impair the properties of the aluminum alloy substrate according to the disclosure.

A-2. Surface State (Waviness) of the Aluminum Alloy Substrate According to the Disclosure The aluminum alloy substrate for a magnetic disk according to the disclosure is composed of an Al—Fe alloy, which may cause generation of compound particles, but has reduced surface deficiencies after electroless Ni—P plating. Such a reduction in deficiencies is achieved by removing compound particles from the substrate surface by a compound removal process (explained in detail below) for optimizing the surface state. In addition, the aluminum alloy substrate according to the disclosure has surface waviness within a predetermined range. The following explanation is directed to mechanisms of generation of the waviness and the waviness of the substrate surface according to the disclosure.

The surface of the aluminum alloy substrate after the electroless Ni—P plating is polished. This surface appears to be smooth but actually has fine waviness. The waviness can be measured using a device, such as the μ-XAM. Specifically, when the profile of the surface roughness is divided into waves having mutually different wavelengths, the amplitude of each wavelength corresponds to the level of waviness. This amplitude is in the order of several nanometers. In other words, irregularities in the order of several nanometers remain on the polished surface of the magnetic disk substrate.

The waviness is related to irregularities called nodules on the surface of the aluminum alloy substrate after the electroless Ni—P plating. Most of these nodules have a shape of hemispherical protrusion. The number of nodules is increased in response to nonuniform plating reactions (in particular, substitution reactions between Zn and Ni—P on the substrate surface at the first stage) in the electroless Ni—P plating. The nodules can be removed by polishing after plating. A height difference is however generated between areas having nodules and the other areas having no nodule, and causes a difference in polishing amount, resulting in fine irregularities that constitute the waviness.

The generation of nodules is affected by the existence of compound particles on the substrate surface before the electroless Ni—P plating. Although the substrate according to the disclosure is composed of an Al—Fe alloy, which may cause generation of compound particles, compound particles on the substrate surface are removed before the electroless Ni—P plating process. The substrate surface after the electroless Ni—P plating therefore has waviness within a predetermined range. Specifically, the maximum amplitude of waviness in a wavelength range of 0.4 to 5.0 mm is 5 nm or less, and the maximum amplitude of waviness in a wavelength range of 0.08 to 0.45 mm is 1.5 nm or less.

In an HDD, a reading head is suspended while maintaining a distance of several tens of nanometers (several nanometers in the latest techniques) from the magnetic disk surface. In the case of a large amplitude of waviness, the head cannot follow the waviness of the rapidly rotating magnetic disk. The distance between the head and the disk surface varies and thus causes fluctuations in output, leading to unstable reading and writing operations. The head's ability to follow the surface waviness of the magnetic disk also depends on the wavelength of waviness. That is, the head can readily follow the waviness having a long wavelength but cannot readily follow the waviness having a short wavelength. As described above, the amplitude and wavelength of waviness affects the following ability of the reading head, which may inhibit development of high-speed HDDs.

An aluminum alloy substrate having surface waviness within the range according to the disclosure can achieve a magnetic disk capable of preferable operations and can be applied to high-speed HDDs and the like. Specifically, the head can follow the waviness of the magnetic disk, if the maximum amplitude of waviness in a wavelength range of 0.4 to 5.0 mm is 5 nm or less, and if the maximum amplitude of waviness in a wavelength range of 0.08 to 0.45 mm is 1.5 nm or less. More preferable waviness is defined such that the maximum amplitude of waviness in a wavelength range of 0.4 to 5.0 mm is 2.5 nm or less, and the maximum amplitude of waviness in a wavelength range of 0.08 to 0.45 mm is 1 nm or less.

The waviness of the aluminum alloy substrate before spattering of a magnetic material, or the waviness of the substrate after the Ni—P plating before spattering of a magnetic material, is the governing factor of the waviness of the magnetic disk. The magnetic material is merely spattered on the surface of the aluminum alloy substrate and does not affect the original waviness of the aluminum alloy substrate.

A-3. Fluttering Characteristics of the Aluminum Alloy Substrate According to the Disclosure As described above, unstable airflows generated between the rapidly rotating magnetic disks cause fluttering of a magnetic disk. At a high level of fluttering, the head cannot follow the displacement of the magnetic disk.

The level of fluttering is measured as a displacement at a certain frequency. Since the maximum displacement decreases according to an increase in frequency, a reduction in maximum displacement at a low frequency directly leads to a reduction in fluttering. Although the fluttering can also be reduced by filling an HDD with a helium gas having low viscosity, but this configuration requires higher costs. Required is a procedure to reduce fluttering in the air.

The aluminum alloy substrate for a magnetic disk according to the disclosure is composed of an Al—Fe alloy, which may cause generation of compound particles that can increase the strength and absorb the vibration energy of fluttering. The aluminum alloy substrate can thus provide a preferable strength and certain fluttering characteristics. Specifically, in the aluminum alloy substrate according to the disclosure, the maximum displacement in the air at a frequency of 100 Hz or more should preferably be 200 nm or less. This level of fluttering characteristics is considered to be sufficient. The maximum displacement can be smaller in the disclosure. Specifically, the level of fluttering characteristics should more preferably 150 nm or less.

A-4. Yield Stress of the Aluminum Alloy Substrate According to the Disclosure

The method of fabricating the substrate for a magnetic disk involves a pressure annealing process (explained below). A high annealing temperature in this process leads to an improvement in flatness of the magnetic disk. A good flatness of the disk causes an improvement in flatness of the plating. In order to stably obtain the good flatness, the pressure annealing should preferably be conducted at approximately 300° C. However, as the annealing temperature increases, the yield stress of the aluminum alloy substrate decreases.

If the aluminum alloy substrate after the pressure annealing at 300° C. has a yield stress of less than 100 MPa, the substrate may be deformed when its inner edge is fixed during transportation between the subsequent processes. The possibility of deformation can be reduced at a yield stress exceeding 100 MPa and can be eliminated at a yield stress of 120 MPa or more. Accordingly, the yield stress of the aluminum alloy substrate according to the disclosure after a heat treatment at 300° C. for three hours should preferably be 120 MPa or more and more preferably 150 MPa.

B. Method of Fabricating the Aluminum Alloy Substrate According to the Disclosure A method of fabricating the aluminum alloy substrate according to the disclosure will now be explained. The method of fabricating the aluminum alloy substrate according to the disclosure is basically the same as existing methods of fabricating aluminum alloy substrates. Specifically, the method involves: a casting process of casting a molten alloy adjusted to have a certain composition to produce an aluminum alloy cast plate; and a rolling process of homogenizing and hot rolling the cast plate as required and cold rolling the cast plate to produce an aluminum alloy plate. These processes are followed by a process of extracting an annular aluminum alloy plate from the aluminum alloy plate and then annealing and flattening the annular aluminum alloy plate under a pressure. The annular aluminum alloy plate after the pressure annealing process is subject to a substrate preparing process, which includes a grinding step and a stress-relieving heat treatment step in the order mentioned, and a plating pretreatment process, which includes an alkaline degreasing step, an acid etching step, a desmutting step, and at least one zincate treatment step in the order mentioned. The annular aluminum alloy plate after the plating pretreatment process is then provided with electroless Ni—P plating on its surfaces, thereby completing an aluminum alloy substrate for a magnetic disk.

The disclosure should preferably be directed to a magnetic disk having an outer diameter of 95 to 97 mm. This magnetic disk having such a large outer diameter particularly tends to suffer from the problem of fluttering.

The method of fabricating the aluminum alloy substrate according to the disclosure has two features for obtaining a preferable strength and surface state. The two features include: the casting process that involves continuous casting to produce an aluminum alloy cast plate; and a predetermined compound removal process conducted at a timing between the grinding step and the zincate treatment step. The following explanation will discuss the method of fabricating the aluminum alloy substrate according to the disclosure with reference to these features in detail.

B-1. Casting Process

First, an aluminum alloy having a certain range of composition is heated and melted by a general method to prepare a molten aluminum alloy. The resulting molten aluminum alloy is cast to produce an aluminum alloy cast plate in the casting process.

According to the disclosure, the casting process involves a continuous casting method (CC method) of casting an aluminum alloy in order to ensure the strength and yield stress of an aluminum alloy substrate to be yielded. In detail, the inventors have conducted studies on aluminum alloys having the above-described composition, some of which are produced by a continuous casting method and the others are produced by a semi-continuous casting method (DC method). As a result, the inventors have confirmed that some of the aluminum alloy substrates produced by the DC method have an insufficient strength and yield stress and are therefore not effective for reducing disk fluttering and suppressing deformation during operation. The inventors have attributed this problem to the upper limit of the amounts of the elements dissolved in the aluminum alloy due to the upper limit of the cooling rate of the DC method in the casting process.

The inventors have considered that the CC method can be performed at a higher cooling rate than that of the DC method and thus increase the amounts of the elements dissolved in the aluminum alloy. The inventors have then confirmed that the CC method can yield an aluminum alloy having a sufficient strength and thus causing a low level of disk fluttering.

In the case of the CC method, a molten metal is supplied between a pair of rollers (alternatively, belt casters or block casters) through a casting nozzle, and is cooled by the rollers, to directly produce an aluminum alloy cast plate. In the CC method, the temperature of the aluminum alloy cast plate after the elapse of one minute from the casting is defined to be within the range of 230° C. to 350° C. Furthermore, the temperature of the cast plate after the elapse of ten minutes from the casting is defined to be 150° C. or more and less than 230° C. These definitions (the temperature of the cast plate after the elapse of one minute from the casting to be 230° C. to 350° C. and the temperature after the elapse of ten minutes to be 150° C. or more and less than 230° C.) can achieve distribution of a number of fine second phase particles (mainly Al—Fe compound particles) to increase the strength. This CC method yields an aluminum alloy cast plate having a thickness of approximately 2.0 to 10.0 mm.

Exemplary procedures of cooling the cast plate in the CC method include fan cooling, mist cooling, shower cooling, and water cooling.

As explained above, the casting process involves the CC method according to the disclosure. When aluminum alloys having a range of composition according to the disclosure are compared between the applied casting methods, for example, in terms of yield stress after a heat treatment at 300° C. for three hours, the yield stress provided by the DC method is approximately 60 MPa while the yield stress provided by the CC method exceeds 100 MPa and potentially exceeds 150 MPa.

B-2. Rolling Process

Second, the resulting aluminum alloy cast plate is homogenized as required and is cold rolled to produce an aluminum alloy plate.

The homogenization, which is an optional step, involves heating at a temperature of 300° C. to 450° C. for a period of 0.5 to 24 hours. The homogenization can increase the size uniformity of second phase particles, thereby reducing the variations in the strength and fluttering characteristics of aluminum alloy substrates.

The cast plate after the CC method or after the homogenization is then cold rolled to have a certain thickness required as a product. This cold rolling step yields an aluminum alloy plate having a thickness of approximately 0.45 to 1.8 mm.

The conditions of the cold rolling step are not particularly defined but can be determined depending on the strength and thickness required as a product. The reduction ratio should preferably be within the range of 10% to 95%. The process may include an annealing step before or during the cold rolling, in order to ensure the cold rolling process ability. In the case of a process including the annealing, such as annealing in a batch system, preferable conditions include a temperature of 200° C. or more and less than 380° C. and a period of 0.1 to 10 hours.

B-3. Pressure Annealing Process

The resulting aluminum alloy plate is then punched into an annular shape to produce an annular aluminum alloy plate. This annular aluminum alloy plate is annealed and flattened under a pressure. The pressure annealing process involves a heat treatment at a temperature of 200° C. to 350° C. for a period of 30 minutes or more in a pressurized state to flatten the annular aluminum alloy plate. This flattened annular aluminum alloy plate after the pressure annealing process is also called a disk blank in some cases.

B-4. Substrate Preparing Process

The flattened annular aluminum alloy plate is then subject to a substrate preparing process including a grinding step and a stress-relieving heat treatment step. The grinding step involves fine adjustment of the shape and size by processing. At this stage, an optional cutting step may be performed as required. It should be noted that this cutting step has no effect on the properties, such as disk fluttering and waviness.

The grinding step is followed by the stress-relieving heat treatment step. Preferable conditions of the heat treatment include a temperature of 250° C. to 400° C. and a period of 5 to 15 minutes.

B-5. Plating Pretreatment Process

The annular aluminum alloy plate after the substrate preparing process is then subject to a plating pretreatment process that precedes an electroless Ni—P plating process. At any timing between the substrate preparing process and this plating pretreatment process, a compound removal process that characterizes the disclosure is conducted.

In order to facilitate understanding of the relation between the respective processes and steps, FIG. 1 illustrates preferable configurations of the plating pretreatment process. In FIG. 1, an unprocessed sample in Step 0 indicates an annular aluminum alloy plate (disk blank) after the substrate preparing process. This unprocessed sample has been subject to the pressure annealing process, the grinding step, and the stress-relieving heat treatment step, as explained above. The unprocessed sample usually has dirt adhering to its surface and has a thickness different from other unprocessed samples.

Steps 1 to 6 in FIG. 1 correspond to the plating pretreatment process according to the disclosure. The plating pretreatment process involves an alkaline degreasing step (Step 1), an acid etching step (Step 2), a desmutting step (Step 3), and zincate treatment steps (Steps 4 to 6) in the order mentioned. It should be noted that the exemplary method illustrated in FIG. 1 include two times of zincate treatments (first and second zincate treatments).

In the alkaline degreasing step (Step 1), the dirt adhering to the substrate surface is removed. The alkaline degreasing is conducted using a commercially available degreasing solution (for example, the degreasing solution AD-68F manufactured by C.Uyemura & Co., Ltd.). Preferable degreasing conditions include a temperature of 40° C. to 70° C., a treatment period of three to ten minutes, and a concentration of 200 to 800 mL/L.

In the acid etching step (Step 2), the oxidized film on the surface of the aluminum alloy substrate is removed. The acid etching is conducted using a commercially available etchant (for example, the etchant AD-107F manufactured by C. Uyemura & Co., Ltd.). Preferable conditions of acid etching include a temperature of 50° C. to 75° C., a treatment period of 0.5 to 5 minutes, and a concentration of 20 to 100 mL/L.

In the desmutting step (Step 3), a thin oxidized film is generated on the surface of the aluminum alloy plate to substantially equalize the thicknesses of the oxidized films on the respective samples. The desmutting is conducted using an $HNO_3$ solution as in a typical desmutting procedure. Preferable desmutting conditions include a temperature of 15° C. to 40° C., a treatment period of 10 to 120 seconds, and a concentration of 10% to 60%.

The desmutting step may be omitted in some cases depending on the timing of the compound removal process. Specifically, if a substrate has already undergone the compound removal process at the time of completion of the acid etching step, the substrate is desmutted. In contrast, if a substrate has not yet undergone the compound removal process at the time of completion of the acid etching step, the substrate is subject to the compound removal process instead of the desmutting step, thereby omitting the desmutting step. It should be noted that these process and step may be redundantly conducted, that is, the compound removal process may be conducted in addition to the desmutting step. The preceding steps can adjust the surface of the aluminum alloy plate to a preferable state. The steps can also equalize the surface states of all the samples.

The aluminum alloy plate after the desmutting step receives at least one zincate treatment, which provides a zincate coating on the plate surface. The aluminum alloy plate may receive two or more zincate treatments. Multiple zincate treatments cause deposition of fine Zn particles and thus provide a uniform zincate coating.

In a first zincate treatment step (Step 4) in FIG. 1, deposition of fine Fe particles on the surface of the aluminum alloy plate is followed by dissolution of the aluminum alloy caused by cell reactions between the Fe particles and the aluminum alloy plate. The substitution reactions then occur and cause Zn to be deposited, thereby providing a zincate coating. The first zincate treatment is conducted using a commercially available zincate solution (for example, the zincate solution AD-301F-3X manufactured by C. Uyemura & Co., Ltd.). Preferable conditions of first zincate treatment include a temperature of 10° C. to 35° C., a treatment period of 0.1 to 5 minutes, and a concentration of 100 to 500 mL/L.

In a Zn peeling step (Step 5), the Zn deposited in the first zincate treatment step is dissolved while leaving the Fe particles. The Zn peeling is conducted using an $HNO_3$ solution. Preferable conditions of Zn peeling include a temperature of 15° C. to 40° C., a treatment period of 10 to 120 seconds, and a concentration of 10% to 60%.

A second zincate treatment step (Step 6) is then conducted. Although the second zincate treatment causes the same reactions as those in the first zincate treatment, deposition of another Fe particles increases the sites of cell reactions, so that finer Zn are deposited to provide a uniform zincate coating. The second zincate treatment should preferably be conducted in the same conditions as those of the first zincate treatment.

The aluminum alloy plate after the above-explained plating pretreatment process including the last zincate treatment step is then subject to an electroless Ni—P plating process (Step 7) and thus converted into an aluminum alloy substrate for a magnetic disk. The disclosure is characterized by the compound removal process, which is not included in existing methods, to reduce deficiencies on the electroless Ni—P plated surface, as shown in FIG. 1. The compound removal process will now be explained in detail.

B-6. Compound Removal Process

The following explanation is directed to the technical significance of this process. The compound removal process indicates a process of removing compound particles in the vicinity of the surface of an aluminum alloy plate using a certain solution. An objective of this process is to reduce surface deficiencies after electroless Ni—P plating. The compound particles on the surface of the aluminum alloy plate and the deficiencies on the electroless Ni—P plated surface are considered to have a relationship explained below:

The electroless Ni—P plating to the aluminum alloy plate is proceeded by substitution reactions with Zn, which constitutes the zincate coating provided in the plating pretreatment process. That is, the deficiencies on the electroless Ni—P plated surface are derived from the nonuniform zincate coating. The above-explained zincate treatment is proceeded by cell reactions between fine Fe particles deposited on the surface of the aluminum alloy plate and the matrix (aluminum alloy). If compound particles exist on the surface of the aluminum alloy plate, local cell reactions occur also between the compound particles and the matrix. These phenomena make the reactions on the entire aluminum alloy plate nonuniform, thereby causing nonuniform deposition of Zn. This configuration leads to extremely nonuniform initial reactions in the subsequent electroless Ni—P plating process, resulting in generation of deficiencies.

The deficiencies on the electroless Ni—P plated surface emerge in the form of irregularities (nodules) on the plated surface. A high density of compound particles causes generation of a number of nodules. The nodules affect the waviness of the aluminum alloy substrate and the magnetic disk, as described above. For these reasons, required is a reduction in compound particles remaining on the surface of the aluminum alloy substrate.

The above-described relationship between compound particles and plating deficiencies have already been acknowledged also in existing aluminum alloy substrates (for example, the JIS 5086 Al—Mg alloy and the alloy disclosed in Patent Literature 1). It should be noted that the existing aluminum alloy substrates are composed of aluminum alloys having extremely low Fe and Si contents in consideration of adverse effects of compound particles. In these aluminum alloy substrates, compound particles are small and exist at a low density. These compound particles can be sufficiently removed by the above fabrication processes, in particular, the acid etching step (Step 2) in the existing aluminum alloy substrates. The acid etching dissolves and removes the oxidized film on the aluminum alloy surface, and simultaneously dissolves a slight amount of the matrix and thus removes a small amount of compound particles. That is, the existing aluminum alloy substrates do not require a process dedicated to removal of compound particles.

In contrast, the aluminum alloy substrate according to the disclosure is composed of an Al—Fe alloy having a relatively high content of Fe. Because of this Fe content, relatively large compound particles may be generated at a high density. The compound particles according to the disclosure indicate Al—Fe intermetallic compound particles, such as Al—Fe and Al—Fe—Mn. Al—Mn intermetallic compound particles and Al—Cu intermetallic compound particles may be generated depending on the composition of the aluminum alloy.

According to the disclosure, the casting process involves the CC method in order to ensure the strength and yield stress of the aluminum alloy substrate. The aluminum alloy plate fabricated by the CC method tends to have a nonuniform distribution of compound particles and may have a dense distribution of compound particles in the vicinity of the plate surface.

Figure 2:
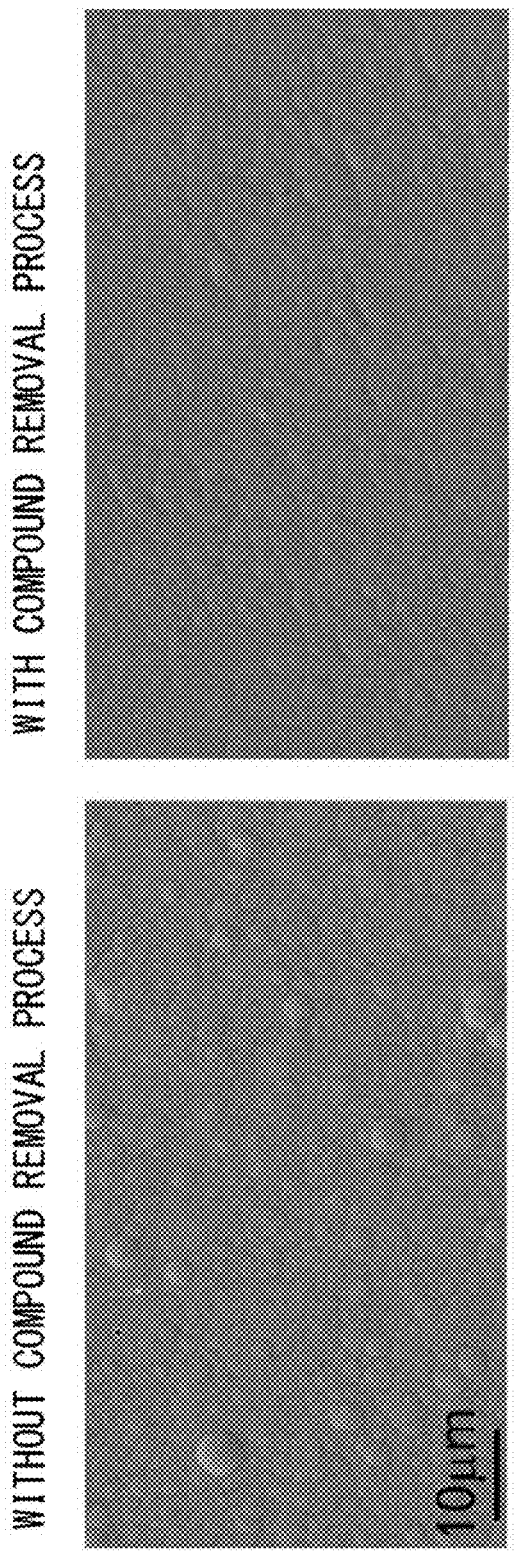
FIG. 2 illustrates SEM images of an electroless Ni—P plated surface.

As explained above, the aluminum alloy substrate according to the disclosure is expected to have compound particles having a large size and a high density, due to both of the composition and fabrication method of the aluminum alloy. In this aluminum alloy plate, an acid etching step at a level of dissolving a small amount of the matrix cannot remove compound particles. The fabrication method according to the disclosure therefore includes a process aimed at removal of compound particles. FIG. 2 illustrates images of an electroless Ni—P plated surface with and without the compound removal process, which clearly show a difference in generated nodules.

Then, the details of the compound removal process will be explained. The compound removal process removes compound particles remaining on the surface of the aluminum alloy plate using a solution. The used solution is an $HNO_3$/HF mixed solution (hereinafter abbreviated simply as "mixed solution"), which is a solution at a temperature of 10° C. to 30° C. having an $HNO_3$ concentration of 10 to 60 mass % (hereinafter abbreviated as "%") and an HF concentration of 10 to 80 g/L. This mixed solution has a high etching power and increases the rate of dissolution of the aluminum alloy substrate especially around compound particles. The dissolution of the aluminum alloy substrate around compound particles can achieve removal of the compound particles, so as to selectively remove only the compound particles on the surface of the aluminum alloy substrate.

A mixed solution having an HF concentration of less than 10 g/L and an $HNO_3$ concentration of less than 10% has a low etching power and cannot sufficiently remove the compound particles on the surface of the aluminum alloy substrate. In contrast, a mixed solution having an HF concentration exceeding 80 g/L and an $HNO_3$ concentration exceeding 60% has an excessively high etching power and significantly dissolves the matrix of the aluminum alloy plate. This phenomenon increases the sizes of irregularities on the surface of the aluminum alloy substrate, thereby impairing the smoothness of the electroless Ni—P plated surface and increasing the waviness. The HF concentration should preferably be within the range of 20 to 60 g/L, and the $HNO_3$ concentration should preferably be within the range of 25% to 50%.

The temperature of the mixed solution is defined to be within the range of 10° C. to 30° C. At a temperature of less than 10° C., compound particles on the surface of the aluminum alloy substrate cannot be sufficiently removed due to a low rate of reaction. In contrast, at a temperature exceeding 30° C., the matrix of the aluminum alloy plate is significantly dissolved due to an excessively high rate of reaction, thereby increasing the sizes of irregularities on the surface of the aluminum alloy substrate and thus increasing the level of waviness. The temperature of the mixed solution should preferably be within the range of 15° C. to 25° C. In addition, the treatment period in the compound removal process is defined to be within the range of 5 to 60 seconds. With a treatment period of less than five seconds, compound particles on the surface of the aluminum alloy substrate cannot be sufficiently removed due to an excessively short reaction time. In contrast, with a treatment period exceeding 60 seconds, the matrix of the aluminum alloy plate is significantly dissolved due to an excessively long reaction time, thereby increasing the sizes of irregularities on the surface of the aluminum alloy substrate and thus increasing the level of waviness. The treatment period should preferably be within the range of 10 to 30 seconds.

The compound removal process is conducted at a timing after the grinding step of the substrate preparing process and before the zincate treatment step of the plating pretreatment process. In the case of two or more zincate treatment steps, the timing is before the first one of the zincate treatment steps. Exemplary timings of the compound removal process will now be explained with reference to FIG. 1. For example, the compound removal process may be conducted after the desmutting step (Step 3) before the first zincate treatment step (Step 4). Alternatively, the compound removal process may be conducted instead of the desmutting step. Alternatively, the compound removal process may be conducted at any timing after the grinding step that precedes the plating pretreatment process, and before the alkaline degreasing step (Step 1). In this case, an optional step (not essential) that is the same as the acid etching step may be added before the compound removal process to remove the oxidized film on the surface of the aluminum alloy plate.

B-7. Electroless Ni—P Plating Process

The aluminum alloy plate after the above-explained compound removal process and the zincate treatment steps is subject to the electroless Ni—P plating process, which provides base plating of a magnetic disk (Step 7 in FIG. 1). In this electroless Ni—P plating process, substitution reactions between Zn and Ni—P proceed on the surface of the aluminum alloy plate at the first stage until the surface is covered with Ni—P. Then, Ni—P is deposited on the Ni—P layer by autocatalytic reactions at the second stage.

The electroless Ni—P plating process should preferably be conducted using a commercially available plating solution (for example, the plating solution NIMUDEN HDX manufactured by C. Uyemura & Co., Ltd.) at a temperature of 80° C. to 95° C., for a treatment period of 30 to 180 minutes, and at an Ni concentration of 3 to 10 g/L.

This electroless Ni—P plating process can yield an aluminum alloy substrate for a magnetic disk according to the disclosure. The Ni—P plated aluminum alloy substrate is then polished. Although the conditions of polishing are not particularly limited, the amount of polishing should preferably be 1 μm or more per one surface. A typical abrasive material used in this process is colloidal silica, for example.

C. Magnetic Disk According to the Disclosure

Based on the above-explained aluminum alloy substrate for a magnetic disk according to the disclosure, the magnetic disk according to the disclosure has a low level of disk fluttering and a low level of waviness.

Specifically, the aluminum alloy substrate according to the disclosure has reduced deficiencies on the Ni—P plated surface, so that the maximum amplitude of waviness in a wavelength range of 0.4 to 5.0 mm is 5.0 nm or less, and the maximum amplitude of waviness in a wavelength range of 0.08 to 0.45 mm is 1.5 nm or less. The magnetic disk according to the disclosure includes this substrate and a magnetic medium thereon composed of layers, such as a magnetic layer. The magnetic disk provides waviness having the same wavelengths and amplitudes as this aluminum alloy substrate.

Furthermore, the aluminum alloy substrate according to the disclosure is composed of an Al—Fe alloy having a high strength, so that the maximum displacement (level of disk fluttering) at a frequency of 100 Hz or more is 200 nm or less. The magnetic disk according to the disclosure provides the same fluttering characteristics as this aluminum alloy substrate.

The magnetic disk according to the disclosure is fabricated by spattering a magnetic medium on the surface of the aluminum alloy substrate according to the disclosure. The magnetic medium includes a foundation layer, a magnetic layer, a protective film, and a lubricating layer. The surface of the aluminum alloy substrate may be polished before spattering of the magnetic medium.

First Embodiment

Examples and comparative examples of the disclosure will now be described in more detail but should not be construed as limiting the disclosure.

First, each of the aluminum alloys having the compositions shown in Tables 1 and 2 was melted by a general method to prepare a molten aluminum alloy. Second, the molten aluminum alloy was cast by a CC method to produce a thin plate (cast plate) having a thickness of 6 mm. This thin plate was then cold rolled into a final rolled plate having a thickness of 0.8 mm. The resulting aluminum alloy plate was punched into an annular shape to yield an annular aluminum alloy plate having an outer diameter of 96 mm and an inner diameter of 24 mm.

TABLE 1

CONSTITUENT ELEMENTS (mass %)

| ALLOY No. | Fe | Mn | Cu | Zn | Si | Ni | Mg | Cr | Zr | Ti | B | V | Ti + B + V | Al + UNAVOIDABLE IMPURITIES |
|---|---|---|---|---|---|---|---|---|---|---|---|---|---|---|
| A1 | 1.4 | 0.7 | 0.020 | 0.500 | 0.2 | — | — | — | — | — | — | — | — | Bal. |
| A2 | 0.4 | 0.7 | 0.020 | 0.500 | — | — | — | — | — | — | — | — | — | Bal. |
| A3 | 3.0 | 0.7 | 0.020 | 0.500 | — | — | — | — | — | — | — | — | — | Bal. |
| A4 | 1.4 | 0.1 | 0.020 | 0.500 | — | — | — | — | — | — | — | — | — | Bal. |
| A5 | 1.4 | 3.0 | 0.020 | 0.500 | — | — | — | — | — | — | — | — | — | Bal. |
| A6 | 1.4 | 0.7 | 0.005 | 0.500 | — | — | — | — | — | — | — | — | — | Bal. |
| A7 | 1.4 | 0.7 | 1.000 | 0.500 | — | — | — | — | — | — | — | — | — | Bal. |
| A8 | 1.4 | 0.7 | 0.020 | 0.005 | — | — | — | — | — | — | — | — | — | Bal. |
| A9 | 1.4 | 0.7 | 0.020 | 1.000 | — | — | — | — | — | — | — | — | — | Bal. |
| A10 | 1.4 | 0.7 | 0.020 | 0.500 | 0.1 | — | — | — | — | — | — | — | — | Bal. |

TABLE 1-continued

CONSTITUENT ELEMENTS (mass %)

| ALLOY No. | Fe | Mn | Cu | Zn | Si | Ni | Mg | Cr | Zr | Ti | B | V | Ti + B + V | Al + UNAVOIDABLE IMPURITIES |
|---|---|---|---|---|---|---|---|---|---|---|---|---|---|---|
| A11 | 1.4 | 0.7 | 0.020 | 0.500 | 0.4 | — | — | — | — | — | — | — | — | Bal. |
| A12 | 1.4 | 0.7 | 0.020 | 0.500 | — | 0.1 | — | — | — | — | — | — | — | Bal. |
| A13 | 1.4 | 0.7 | 0.020 | 0.500 | — | 3.0 | — | — | — | — | — | — | — | Bal. |
| A14 | 1.4 | 0.7 | 0.020 | 0.500 | — | — | 0.1 | — | — | — | — | — | — | Bal. |
| A15 | 1.4 | 0.7 | 0.020 | 0.500 | — | — | 6.0 | — | — | — | — | — | — | Bal. |
| A16 | 1.4 | 0.7 | 0.020 | 0.500 | — | — | — | 0.01 | — | — | — | — | — | Bal. |
| A17 | 1.4 | 0.7 | 0.020 | 0.500 | — | — | — | 1.00 | — | — | — | — | — | Bal. |
| A18 | 1.4 | 0.7 | 0.020 | 0.500 | — | — | — | — | 0.01 | — | — | — | — | Bal. |
| A19 | 1.4 | 0.7 | 0.020 | 0.500 | — | — | — | — | 1.00 | — | — | — | — | Bal. |
| A20 | 1.4 | 0.7 | 0.020 | 0.500 | — | — | — | — | — | 0.002 | 0.002 | 0.001 | 0.005 | Bal. |
| A21 | 1.4 | 0.7 | 0.020 | 0.500 | — | — | — | — | — | 0.200 | 0.200 | 0.100 | 0.500 | Bal. |
| A22 | 1.4 | 0.7 | 0.020 | 0.500 | 0.3 | — | 2.0 | — | — | — | — | — | — | Bal. |
| A23 | 1.4 | 0.7 | 0.020 | 0.500 | — | 1.0 | — | — | 0.10 | — | — | — | — | Bal. |
| A24 | 1.4 | 0.7 | 0.020 | 0.500 | 0.3 | — | — | 0.10 | — | 0.020 | 0.020 | 0.010 | 0.050 | Bal. |
| A25 | 1.4 | 0.7 | 0.020 | 0.500 | — | 1.2 | 0.5 | — | — | — | — | — | — | Bal. |
| A26 | 1.4 | 0.7 | 0.020 | 0.500 | 0.2 | — | — | 0.10 | 0.20 | — | — | — | — | Bal. |
| A27 | 1.4 | 0.7 | 0.020 | 0.500 | 0.2 | 0.3 | 1.0 | 0.20 | 0.20 | — | — | — | — | Bal. |
| A28 | 1.4 | 0.7 | 0.020 | 0.500 | 0.2 | 0.3 | 1.0 | 0.20 | 0.20 | 0.003 | 0.003 | 0.003 | 0.009 | Bal. |
| A29 | 1.3 | 1.0 | 0.500 | 0.800 | — | — | — | — | — | — | — | — | — | Bal. |
| A30 | 2.2 | 2.5 | 0.700 | 0.700 | — | — | — | — | — | — | — | — | — | Bal. |

TABLE 2

CONSTITUENT ELEMENTS (mass %)

| ALLOY No. | Fe | Mn | Cu | Zn | Si | Ni | Mg | Cr | Zr | Ti | B | V | Ti + B + V | Al + UNAVOIDABLE IMPURITIES |
|---|---|---|---|---|---|---|---|---|---|---|---|---|---|---|
| B1 | 0.2 | 0.7 | 0.020 | 0.500 | — | — | — | — | — | — | — | — | — | Bal. |
| B2 | 3.5 | 0.7 | 0.020 | 0.500 | — | — | — | — | — | — | — | — | — | Bal. |
| B3 | 1.4 | 0.07 | 0.020 | 0.500 | — | — | — | — | — | — | — | — | — | Bal. |
| B4 | 1.4 | 3.5 | 0.020 | 0.500 | — | — | — | — | — | — | — | — | — | Bal. |
| B5 | 1.4 | 0.7 | 0.002 | 0.500 | — | — | — | — | — | — | — | — | — | Bal. |
| B6 | 1.4 | 0.7 | 1.500 | 0.500 | — | — | — | — | — | — | — | — | — | Bal. |
| B7 | 1.4 | 0.7 | 0.020 | 0.002 | — | — | — | — | — | — | — | — | — | Bal. |
| B8 | 1.4 | 0.7 | 0.020 | 1.500 | — | — | — | — | — | — | — | — | — | Bal. |
| B9 | 1.4 | 0.7 | 0.020 | 0.500 | 0.7 | — | — | — | — | — | — | — | — | Bal. |
| B10 | 1.4 | 0.7 | 0.020 | 0.500 | — | 3.5 | — | — | — | — | — | — | — | Bal. |
| B11 | 1.4 | 0.7 | 0.020 | 0.500 | — | — | 6.2 | — | — | — | — | — | — | Bal. |
| B12 | 1.4 | 0.7 | 0.020 | 0.500 | — | — | — | 1.50 | — | — | — | — | — | Bal. |
| B13 | 1.4 | 0.7 | 0.020 | 0.500 | — | — | — | — | 1.50 | — | — | — | — | Bal. |
| B14 | 3.3 | 0.7 | 0.020 | 0.500 | 0.3 | — | 0.3 | — | — | — | — | — | — | Bal. |
| B15 | 3.3 | 0.7 | 1.500 | 0.500 | 0.2 | 0.3 | 1.0 | 0.20 | 0.20 | 0.003 | 0.003 | 0.003 | 0.009 | Bal. |
| B16 | 1.4 | 0.7 | 0.020 | 0.500 | 0.8 | 3.5 | 6.2 | 1.50 | 1.50 | — | — | — | — | Bal. |
| B17 | 1.4 | 0.7 | 0.020 | 0.500 | 0.8 | — | — | 1.50 | — | — | — | — | — | Bal. |
| B18 | 1.4 | 4.0 | 0.020 | 0.500 | 0.2 | 0.3 | — | — | 0.20 | — | — | — | — | Bal. |
| B19 | 3.3 | 3.5 | 1.500 | 1.500 | — | — | — | — | — | — | — | — | — | Bal. |

The resulting annular aluminum alloy plate was heated at 300° C. for three hours under a pressure of 1.5 MPa in the pressure annealing process, thereby producing a disk blank. The end faces of the disk blank were cut such that the disk blank had an outer diameter of 95 mm and an inner diameter of 25 mm. The surfaces of the disk blank were then ground at an amount of 10 μm per one surface.

This grinding step was followed by the compound removal process in this embodiment. The compound removal process was conducted at 25° C. for 20 seconds using a mixed solution having an HF concentration of 40 g/L and an HNO₃ concentration of 50%.

After the compound removal process, the disk blank underwent the plating pretreatment process. The disk blank was degreased at 60° C. for five minutes using the degreasing solution AD-68F (manufactured by C. Uyemura & Co., Ltd.) in the alkaline degreasing step. The disk blank was then subject to acid etching at 65° C. for three minutes using the etchant AD-107F (manufactured by C. Uyemura & Co., Ltd.) in the acid etching step. The disk blank was then desmutted for 50 seconds using the 30% HNO₃ aqueous solution (at a room temperature) in the desmutting step.

The resulting disk blank received a zincate treatment for 50 seconds using the zincate solution AD-301F (manufactured by C. Uyemura & Co., Ltd.) at 25° C. in the first zincate treatment step. The first zincate treatment was followed by peeling of the zincate coating (Zn peeling) for 60 seconds using a 30% HNO₃ aqueous solution (at a room temperature). The disk blank then received another zincate treatment for 60 seconds using the zincate solution AD-301F (manufactured by C. Uyemura & Co., Ltd.) at 25° C. in the second zincate treatment step.

The disk blank after completion of the plating pretreatment process including the second zincate treatment was then provided with electroless plating of Ni—P at a thickness of 17 µm for 150 minutes using the electroless Ni—P plating solution NIMUDEN HDX (manufactured by C. Uyemura & Co., Ltd.) at 90° C. This process was followed by polish finishing (at an amount of 4 µm per one surface) with a fabric, and thus completed an aluminum alloy substrate for a magnetic disk according to the embodiment.

In this embodiment, the yield stress of each of the above-described aluminum alloys and the waviness, plating smoothness, and level of fluttering characteristics of each of the fabricated aluminum alloy substates were measured and evaluated. Methods of measuring and evaluating these properties will be explained below:

[Evaluation 1: Yield Stress]

The yield stress of each of the aluminum alloys was measured by annealing (heating for simulating pressure annealing) an aluminum alloy plate after cold rolling at 300° C. for three hours and then sampling JIS 5 test specimens (n=2) extending in the rolling direction, in accordance with JIS Z 2241. As the grades of strength, a yield stress of 120 MPa or more was evaluated as "A", 100 MPa or more and less than 120 MPa as "B", and less than 100 MPa as "C".

[Evaluation 2: Waviness]

Each of the fabricated aluminum alloy substrates was analyzed in five areas having a size of 2.5 mm×3.3 mm using the device µ-XAM (manufactured by KLA Tencor), to calculate the maximum amplitude of waviness for each wavelength.

Based on the measurement results, if the maximum amplitude of waviness in a wavelength range of 0.4 to 5.0 mm was 2.5 nm or less and if the maximum amplitude of waviness in a wavelength range of 0.08 to 0.45 mm was 1 nm or less, the aluminum alloy substrate was evaluated as "A". If the maximum amplitude of waviness in a wavelength range of 0.4 to 5.0 mm was 5 nm or less and if the maximum amplitude of waviness in a wavelength range of 0.08 to 0.45 mm was 1.5 nm or less, the substrate was evaluated as "B". If the maximum amplitude of waviness in a wavelength range of 0.4 to 5.0 mm was more than 5 nm or if the maximum amplitude of waviness in a wavelength range of 0.08 to 0.45 mm was more than 1.5 nm, the substrate was evaluated as "C".

[Evaluation 3: Plating Smoothness]

Each of the fabricated aluminum alloy substrates was immersed in 50 vol % $HNO_3$ at 50° C. for seven minutes to etch the Ni—P plated surface. The Ni—P plated surface after the etching was observed using an optical microscope at a magnification of 1,000× in 30 fields. Then, the arithmetic average of the number of plating deficiencies was calculated. An arithmetic average of less than three per field was evaluated as "A", three or more and less than ten per field as "B", and ten or more per field as "C". The grades A and B were acceptable while the grade C was unacceptable.

[Evaluation 4: Fluttering Characteristics]

Each of the fabricated aluminum alloy substrates was installed in a commercially available hard disk drive in the presence of air and evaluated in terms of fluttering characteristics. The used hard disk drive was ST2000 (commercial name, manufactured by Seagate Technology LLC). The motor was directly coupled to and driven by the driver SLD102 (commercial name, manufactured by Tekunoaraibu kabushikigaisha). The rotational speed of aluminum alloy substrates was set to 7,200 rpm. A plurality of aluminum alloy substrates was installed all the time, and the upper one of the substrates was provided with the laser Doppler vibrometer LDV1800 (commercial name, manufactured by Ono Sokki Co., Ltd.) on the substrate surface to observe vibration of the surface. The observed vibration was subject to spectrum analysis using the FFT analyzer DS3200 (commercial name, manufactured by Ono Sokki Co., Ltd.). The surface of the substrate was observed through an opening preliminarily formed in the cover of the hard disk drive. The squeeze plate of the commercially available hard disk drive was preliminarily removed for evaluation.

The level of fluttering characteristics was evaluated based on the maximum displacement (level of disk fluttering (nm)) of a broad peak near the range of 300 to 1,500 Hz in which fluttering emerges. This broad peak is called non-repeatable run out (NRRO) and has been known as significantly affecting the occurrence of errors in positioning of the head. The level of fluttering characteristics of 150 nm or less in the air was evaluated as "A", the level of more than 150 nm and equal to or less than 200 nm as "B", and the level of more than 200 nm as "C". The grades A and B were acceptable while the grade C was unacceptable.

The results of measurement and evaluation on the above properties are shown in Tables 3 and 4. The following description will discuss each of the examples and comparative examples based on Tables 1 to 4.

TABLE 3

| | ALLOY | CASTING | SURFACE PROCESSING | WAVINESS MAXIMUM AMPLITUDE | | | STRENGTH | PLATING SMOOTHNESS | FLUTTERING CHARACTERISTICS |
| | | | | 0.4-5.0 mm | 0.08-0.45 mm | EVALUATION | | | |
|---|---|---|---|---|---|---|---|---|---|
| EXAMPLE 1 | A1 | CC | GRINDING | C1 | 2.0 | 0.6 | A | A | A |
| EXAMPLE 2 | A2 | CC | GRINDING | C1 | 1.1 | 0.4 | A | B | B |
| EXAMPLE 3 | A3 | CC | GRINDING | C1 | 2.8 | 1.3 | B | A | B |
| EXAMPLE 4 | A4 | CC | GRINDING | C1 | 1.5 | 0.8 | A | B | A |
| EXAMPLE 5 | A5 | CC | GRINDING | C1 | 3.2 | 1.3 | B | A | B |
| EXAMPLE 6 | A6 | CC | GRINDING | C1 | 2.0 | 1.0 | A | A | B |
| EXAMPLE 7 | A7 | CC | GRINDING | C1 | 2.4 | 1.5 | B | A | B |
| EXAMPLE 8 | A8 | CC | GRINDING | C1 | 3.0 | 0.9 | B | A | B |
| EXAMPLE 9 | A9 | CC | GRINDING | C1 | 2.2 | 0.9 | A | A | B |
| EXAMPLE 10 | A10 | CC | GRINDING | C1 | 2.4 | 0.7 | A | A | A |
| EXAMPLE 11 | A11 | CC | GRINDING | C1 | 2.9 | 1.3 | B | A | B |
| EXAMPLE 12 | A12 | CC | GRINDING | C1 | 2.2 | 0.8 | A | A | A |
| EXAMPLE 13 | A13 | CC | GRINDING | C1 | 4.1 | 1.4 | B | A | B |
| EXAMPLE 14 | A14 | CC | GRINDING | C1 | 2.1 | 0.6 | A | A | A |
| EXAMPLE 15 | A15 | CC | GRINDING | C1 | 3.4 | 1.4 | B | A | A |
| EXAMPLE 16 | A16 | CC | GRINDING | C1 | 1.9 | 0.7 | A | A | A |
| EXAMPLE 17 | A17 | CC | GRINDING | C1 | 3.0 | 1.3 | B | A | A |

TABLE 3-continued

| | ALLOY | CASTING | SURFACE PROCESSING | WAVINESS MAXIMUM AMPLITUDE 0.4-5.0 mm | 0.08-0.45 mm | EVALU-ATION | STRENGTH | PLATING SMOOTHNESS | FLUTTERING CHARACTER-ISTICS |
|---|---|---|---|---|---|---|---|---|---|
| EXAMPLE 18 | A18 | CC | GRINDING | C1 | 2.2 | 0.5 | A | A | A |
| EXAMPLE 19 | A19 | CC | GRINDING | C1 | 2.8 | 1.2 | B | A | A |
| EXAMPLE 20 | A20 | CC | GRINDING | C1 | 2.0 | 0.9 | A | A | A |
| EXAMPLE 21 | A21 | CC | GRINDING | C1 | 3.7 | 1.4 | B | A | B |
| EXAMPLE 22 | A22 | CC | GRINDING | C1 | 2.5 | 1.1 | B | A | B |
| EXAMPLE 23 | A23 | CC | GRINDING | C1 | 3.1 | 1.1 | B | A | A |
| EXAMPLE 24 | A24 | CC | GRINDING | C1 | 3.0 | 1.3 | B | A | B |
| EXAMPLE 25 | A25 | CC | GRINDING | C1 | 4.2 | 1.4 | B | A | A |
| EXAMPLE 26 | A26 | CC | GRINDING | C1 | 2.8 | 1.1 | B | A | B |
| EXAMPLE 27 | A27 | CC | GRINDING | C1 | 2.8 | 1.4 | B | A | B |
| EXAMPLE 28 | A28 | CC | GRINDING | C1 | 4.0 | 1.4 | B | A | B |
| EXAMPLE 29 | A29 | CC | GRINDING | C1 | 1.7 | 0.8 | A | A | A |
| EXAMPLE 30 | A30 | CC | GRINDING | C1 | 2.4 | 1.0 | B | A | A |

TABLE 4

| | ALLOY | CASTING | SURFACE PROCESSING | WAVINESS MAXIMUM AMPLITUDE 0.4-5.0 mm | 0.08-0.45 mm | EVALU-ATION | STRENGTH | PLATING SMOOTHNESS | FLUTTERING CHARACTER-ISTICS |
|---|---|---|---|---|---|---|---|---|---|
| COMPARATIVE EXAMPLE 1 | B1 | CC | GRINDING | C1 | 1.2 | 0.3 | A | B | A |
| COMPARATIVE EXAMPLE 2 | B2 | CC | GRINDING | C1 | 5.3 | 2.0 | C | A | C |
| COMPARATIVE EXAMPLE 3 | B3 | CC | GRINDING | C1 | 2.0 | 0.8 | A | B | A |
| COMPARATIVE EXAMPLE 4 | B4 | CC | GRINDING | C1 | 4.8 | 2.0 | C | A | C |
| COMPARATIVE EXAMPLE 5 | B5 | CC | GRINDING | C1 | 2.3 | 1.2 | B | A | C |
| COMPARATIVE EXAMPLE 6 | B6 | CC | GRINDING | C1 | 5.0 | 1.8 | C | A | C |
| COMPARATIVE EXAMPLE 7 | B7 | CC | GRINDING | C1 | 2.2 | 1.5 | B | A | C |
| COMPARATIVE EXAMPLE 8 | B8 | CC | GRINDING | C1 | 2.2 | 1.8 | C | A | C |
| COMPARATIVE EXAMPLE 9 | B9 | CC | GRINDING | C1 | 5.3 | 2.3 | C | A | C |
| COMPARATIVE EXAMPLE 10 | B10 | CC | GRINDING | C1 | 4.9 | 2.0 | C | A | C |
| COMPARATIVE EXAMPLE 11 | B11 | CC | GRINDING | C1 | — | — | — | — | — |
| COMPARATIVE EXAMPLE 12 | B12 | CC | GRINDING | C1 | 4.0 | 1.8 | C | A | C |
| COMPARATIVE EXAMPLE 13 | B13 | CC | GRINDING | C1 | 3.8 | 2.1 | C | A | C |
| COMPARATIVE EXAMPLE 14 | B14 | CC | GRINDING | C1 | 3.8 | 2.2 | C | A | C |
| COMPARATIVE EXAMPLE 15 | B15 | CC | GRINDING | C1 | 3.4 | 1.7 | C | A | C |
| C'OMPARATIVE EXAMPLE 16 | B16 | CC | GRINDING | C1 | — | — | — | — | — |
| COMPARATIVE EXAMPLE 17 | B17 | CC | GRINDING | C1 | 5.2 | 2.1 | C | A | C |
| C'OMPARATIVE EXAMPLE 18 | B18 | CC | GRINDING | C1 | 6.0 | 2.7 | C | A | C |
| COMPARATIVE EXAMPLE 19 | B19 | CC | GRINDING | C1 | 6.1 | 3.2 | C | A | C |

In this embodiment, the examples and comparative examples (Examples 1 to 30 and Comparative Examples 1 to 22) have mutually different compositions of aluminum alloys. The embodiment contributes to studies on the relationship between alloy composition and each property. As shown in Table 2, Examples 1 to 30 (Alloys A1 to A30), in which the aluminum alloys contain preferable amounts of constituent elements, were evaluated as acceptable regarding waviness, strength, and fluttering characteristics. These examples also provided good plating smoothness.

In contrast, Comparative Examples 1 to 19 (Alloys B1 to B19) were evaluated as unacceptable regarding any of the properties, as described below:

Comparative Example 1 was evaluated as unacceptable regarding fluttering characteristics. The insufficient fluttering characteristics seemed to be caused by few second phase particles due to the low Fe content of the alloy (B1).

Comparative Example 2 was evaluated as unacceptable regarding plating smoothness. The poor plating smoothness resulted in a high level of waviness. The alloy (B2) had a high Fe content and thus caused generation of a number of coarse Al—Fe compound particles. The plating deficiencies seemed to be caused by the pits generated after removal of these compound particles in the compound removal process.

Comparative Example 3 having a low Mn content was evaluated as unacceptable regarding fluttering characteristics. The insufficient fluttering characteristics seemed to be caused by few second phase particles due to the low Mn content of the alloy (B3).

Comparative Example 4 was evaluated as unacceptable regarding plating smoothness. The poor plating smoothness resulted in a high level of waviness. The plating deficiencies seemed to be caused by the pits generated after removal of a number of coarse Al—Mn compound particles due to the high Mn content of the alloy (B4).

Comparative Example 5 was evaluated as unacceptable regarding fluttering characteristics due to the low Cu content. This example was also evaluated as unacceptable regarding plating smoothness because of deficiencies on the plated surface derived from the nonuniform zincate coating.

Comparative Example 6 was evaluated as unacceptable regarding plating smoothness due to the high Cu content. The poor plating smoothness resulted in a high level of waviness.

Comparative Example 7 was evaluated as unacceptable regarding fluttering characteristics due to the low Zn content. This example was also evaluated as unacceptable regarding plating smoothness because of deficiencies on the plated surface derived from the nonuniform zincate coating.

Comparative Example 8 was evaluated as unacceptable regarding plating smoothness because of deficiencies on the plated surface derived from a number of irregularities, which were generated because the matrix having a far less noble electric potential due to the high Zn content was severely dissolved in the plating process. The poor plating smoothness resulted in a high level of waviness.

Comparative Example 9 was evaluated as unacceptable regarding plating smoothness. The poor plating smoothness resulted in a high level of waviness. The poor plating smoothness seemed to be caused by a number of coarse Si particles due to the high Si content remaining even after the compound removal process.

Comparative Example 10 was evaluated as unacceptable regarding plating smoothness due to the high Ni content. The poor plating smoothness resulted in a high level of waviness. The plating deficiencies seemed to be caused by the pits generated after removal of a number of coarse Al—Ni compound particles.

Comparative Example 11 failed to conduct the rolling process due to the high Mg content and provided no sample for evaluation.

Comparative Example 12 was evaluated as unacceptable regarding plating smoothness due to the high Cr content. The poor plating smoothness resulted in a high level of waviness. The poor plating smoothness seemed to be caused by generation of coarse Al—Cr compound particles.

Comparative Example 13 was evaluated as unacceptable regarding plating smoothness due to the high Zr content. The poor plating smoothness resulted in a high level of waviness. The poor plating smoothness seemed to be caused by generation of coarse Al—Zr compound particles.

Comparative Example 14 was evaluated as unacceptable regarding plating smoothness due to the high Fe content. The poor plating smoothness resulted in a high level of waviness.

Comparative Example 15 was evaluated as unacceptable regarding plating smoothness due to the high Fe and Cu contents. The poor plating smoothness resulted in a high level of waviness.

Comparative Example 16 failed to conduct the rolling process due to the high Mg content and provided no sample for evaluation.

Comparative Example 17 was evaluated as unacceptable regarding plating smoothness due to the high Si and Cr contents. The poor plating smoothness resulted in a high level of waviness. The poor plating smoothness seemed to be caused by generation of coarse compound particles.

Comparative Example 18 was evaluated as unacceptable regarding plating smoothness due to the high Mn content. The poor plating smoothness resulted in a high level of waviness.

Comparative Example 19 was evaluated as unacceptable regarding plating smoothness due to the high Fe, Mn, and Cu contents. In the case of this alloy, the poor plating smoothness was also caused by deficiencies on the plated surface derived from a number of irregularities, which were generated because the matrix having a far less noble electric potential due to the high Zn content was severely dissolved in the plating process. The poor plating smoothness resulted in a high level of waviness.

Second Embodiment

In this embodiment, aluminum alloy substrates composed of an aluminum alloy having the same composition as that of Example 1 (alloy A1) in the first embodiment were fabricated in mutually different conditions. The fabrication conditions in the embodiment are adjusted as below:

[Casting Condition]

Most of the aluminum alloy substrates were composed of aluminum alloy thin plates fabricated by the CC method as in the first embodiment, while the others were composed of aluminum alloy thin plates fabricated by the DC method.

[Surface Processing]

Most of the disk blanks, which had received end face cutting and had the same size as in the first embodiment, were subject to surface processing (grinding) of grinding the surfaces of the disk blank at an amount of 10 μm per one surface as in the first embodiment, or surface processing (cutting+grinding) of cutting a surface of the disk blank at an amount of 5 μm and then grinding the surface at an amount of 5 μm. Some of the disk blanks, which had received end face cutting, were subject to surface processing (cutting) of only cutting a surface of the disk blank at an amount of 10 μm. The others of the disk blanks received only end face cutting without surface processing.

[Timing and Conditions of the Compound Removal Process]

As shown in Table 5, the compound removal process is conducted at different timings between the procedures.

In Procedures No. C1 to C9 and D1 to D8 shown in Table 5, the above-explained surface processing was followed by the compound removal process, the plating pretreatment (alkaline degreasing to zincate treatment), and then the electroless Ni—P plating, as in the first embodiment, thereby yielding an aluminum alloy substrate.

In contrast, in Procedures No. C10 to C18 and D9 to D17 shown in Table 5, the disk blank after the above-explained surface processing was subject to alkaline degreasing, acid etching, and desmutting as in the first embodiment and then underwent the compound removal process. This process was followed by the zincate treatments and the electroless Ni—P plating as in the first embodiment, thereby yielding an aluminum alloy substrate.

In addition, the conditions of compound removal (an HF concentration and an $HNO_3$ concentration of the mixed solution, a solution temperature, and a treatment period) were adjusted as shown in Table 5.

Some of the aluminum alloy substrates were fabricated by a procedure (Procedure No. D17 in Table 5) without any compound removal process.

TABLE 5

| | PROCESSES AND STEPS | | | | | | |
|---|---|---|---|---|---|---|---|
| | COMPOUND REMOVAL PROCESS | | | | | | |
| PROCE-DURE No. | HF CONCEN-TRATION, g/L | $HNO_3$ CONCEN-TRATION, mass % | SOLUTION TEMPER-ATURE, °C. | TREAT-MENT PERIOD, s | ALKALINE DEGREASING | ACID ETCHING | DESMUTTING |
| C1 | 40 | 50 | 25 | 20 | ↑ | ↑ | ↑ |
| C2 | 10 | 50 | 25 | 20 | ↑ | ↑ | ↑ |
| C3 | 80 | 50 | 25 | 20 | ↑ | ↑ | ↑ |
| C4 | 40 | 10 | 25 | 20 | ↑ | ↑ | ↑ |
| C5 | 40 | 60 | 25 | 20 | ↑ | ↑ | ↑ |
| C6 | 40 | 50 | 10 | 20 | ↑ | ↑ | ↑ |
| C7 | 40 | 50 | 30 | 20 | ↑ | ↑ | ↑ |
| C8 | 40 | 50 | 25 | 5 | ↑ | ↑ | ↑ |
| C9 | 40 | 50 | 25 | 60 | ↑ | ↑ | ↑ |
| C10 | — | — | — | — | ↑ | ↑ | ↑ |
| C11 | — | — | — | — | ↑ | ↑ | ↑ |
| C12 | — | — | — | — | ↑ | ↑ | ↑ |
| C13 | — | — | — | — | ↑ | ↑ | ↑ |
| C14 | — | — | — | — | ↑ | ↑ | ↑ |
| C15 | — | — | — | — | ↑ | ↑ | ↑ |
| C16 | — | — | — | — | ↑ | ↑ | ↑ |
| C17 | — | — | — | — | ↑ | ↑ | ↑ |
| C18 | — | — | — | — | ↑ | ↑ | ↑ |
| D1 | 5 | 50 | 25 | 20 | ↑ | ↑ | ↑ |
| D2 | 100 | 50 | 25 | 20 | ↑ | ↑ | ↑ |
| D3 | 40 | 5 | 25 | 20 | ↑ | ↑ | ↑ |
| D4 | 40 | 70 | 25 | 20 | ↑ | ↑ | ↑ |
| D5 | 40 | 50 | 5 | 20 | ↑ | ↑ | ↑ |
| D6 | 40 | 50 | 40 | 20 | ↑ | ↑ | ↑ |
| D7 | 40 | 50 | 25 | 2 | ↑ | ↑ | ↑ |
| D8 | 40 | 50 | 25 | 70 | ↑ | ↑ | ↑ |
| D9 | — | — | — | — | ↑ | ↑ | ↑ |
| D10 | — | — | — | — | ↑ | ↑ | ↑ |
| D11 | — | — | — | — | ↑ | ↑ | ↑ |
| D12 | — | — | — | — | ↑ | ↑ | ↑ |
| D13 | — | — | — | — | ↑ | ↑ | ↑ |
| D14 | — | — | — | — | ↑ | ↑ | ↑ |
| D15 | — | — | — | — | ↑ | ↑ | ↑ |
| D16 | — | — | — | — | ↑ | ↑ | ↑ |
| D17 | NONE | NONE | NONE | NONE | ↑ | ↑ | ↑ |

| | PROCESSES AND STEPS | | | | | |
|---|---|---|---|---|---|---|
| | COMPOUND REMOVAL PROCESS | | | | | |
| PROCE-DURE No. | HF CONCEN-TRATION, g/L | $HNO_3$ CONCEN-TRATION, mass % | SOLUTION TEMPER-ATURE, °C. | TREAT-MENT PERIOD, s | ZINCATE TREAT-MENT | ELECTRO-LESS Ni-P PLATING |
| C1 | — | — | — | — | ↑ | ↑ |
| C2 | — | — | — | — | ↑ | ↑ |
| C3 | — | — | — | — | ↑ | ↑ |
| C4 | — | — | — | — | ↑ | ↑ |
| C5 | — | — | — | — | ↑ | ↑ |
| C6 | — | — | — | — | ↑ | ↑ |
| C7 | — | — | — | — | ↑ | ↑ |
| C8 | — | — | — | — | ↑ | ↑ |
| C9 | — | — | — | — | ↑ | ↑ |
| C10 | 40 | 50 | 25 | 20 | ↑ | ↑ |
| C11 | 10 | 50 | 25 | 20 | ↑ | ↑ |
| C12 | 80 | 50 | 25 | 20 | ↑ | ↑ |
| C13 | 40 | 10 | 25 | 20 | ↑ | ↑ |
| C14 | 40 | 60 | 25 | 20 | ↑ | ↑ |
| C15 | 40 | 50 | 10 | 20 | ↑ | ↑ |
| C16 | 40 | 50 | 30 | 20 | ↑ | ↑ |
| C17 | 40 | 50 | 25 | 5 | ↑ | ↑ |
| C18 | 40 | 50 | 25 | 60 | ↑ | ↑ |
| D1 | NONE | NONE | NONE | NONE | ↑ | ↑ |

TABLE 5-continued

|  |  |  |  |  |  |  |
|---|---|---|---|---|---|---|
| D2 | NONE | NONE | NONE | NONE | ↑ | ↑ |
| D3 | NONE | NONE | NONE | NONE | ↑ | ↑ |
| D4 | NONE | NONE | NONE | NONE | ↑ | ↑ |
| D5 | NONE | NONE | NONE | NONE | ↑ | ↑ |
| D6 | NONE | NONE | NONE | NONE | ↑ | ↑ |
| D7 | NONE | NONE | NONE | NONE | ↑ | ↑ |
| D8 | NONE | NONE | NONE | NONE | ↑ | ↑ |
| D9 | — | — | — | — | ↑ | ↑ |
| D10 | — | — | — | — | ↑ | ↑ |
| D11 | — | — | — | — | ↑ | ↑ |
| D12 | — | — | — | — | ↑ | ↑ |
| D13 | — | — | — | — | ↑ | ↑ |
| D14 | — | — | — | — | ↑ | ↑ |
| D15 | — | — | — | — | ↑ | ↑ |
| D16 | — | — | — | — | ↑ | ↑ |
| D17 | NONE | NONE | NONE | NONE | ↑ | ↑ |

(1) The procedure No. C1 is the same procedure as in Embodiment 1.
(2) The symbol "↑" means that a procedure is executed under the same.

Each of the fabricated aluminum alloy substrates was measured and evaluated regarding yield stress, waviness, plating smoothness, and fluttering characteristics, in the same manner as in the first embodiment. The results of measurement and evaluation are shown in Tables 6 and 7. The following description will discuss each of the examples and comparative examples based on these tables.

TABLE 6

|  | ALLOY | CASTING | SURFACE PROCESSING | PROCE-DURE | WAVINESS MAXIMUM AMPLITUDE 0.4-5.0 mm | WAVINESS MAXIMUM AMPLITUDE 0.08-0.45 mm | EVALU-ATION | STRENGTH | PLATING SMOOTH-NESS | FLUT-TERING CHAR-ACTER-ISTICS |
|---|---|---|---|---|---|---|---|---|---|---|
| EXAMPLE 31 | A1 | CC | GRINDING | C2 | 1.6 | 1.1 | B | A | A | A |
| EXAMPLE 32 | A1 | CC | GRINDING | C3 | 2.6 | 1.4 | B | A | B | A |
| EXAMPLE 33 | A1 | CC | GRINDING | C4 | 2.3 | 1.1 | B | A | A | A |
| EXAMPLE 34 | A1 | CC | GRINDING | C5 | 2.2 | 0.9 | A | A | A | A |
| EXAMPLE 35 | A1 | CC | GRINDING | C6 | 2.3 | 1.2 | B | A | B | A |
| EXAMPLE 36 | A1 | CC | GRINDING | C7 | 3.1 | 1.2 | B | A | B | A |
| EXAMPLE 37 | A1 | CC | GRINDING | C8 | 2.2 | 0.9 | A | A | B | A |
| EXAMPLE 38 | A1 | CC | GRINDING | C9 | 3.1 | 1.4 | B | A | A | A |
| EXAMPLE 39 | A1 | CC | GRINDING | C10 | 2.2 | 0.8 | A | A | A | A |
| EXAMPLE 40 | A1 | CC | GRINDING | C11 | 1.9 | 1.3 | B | A | A | A |
| EXAMPLE 41 | A1 | CC | GRINDING | C12 | 2.7 | 1.5 | B | A | B | A |
| EXAMPLE 42 | A1 | CC | GRINDING | C13 | 2.5 | 1.6 | B | A | A | A |
| EXAMPLE 43 | A1 | CC | GRINDING | C14 | 2.0 | 0.9 | A | A | A | A |
| EXAMPLE 44 | A1 | CC | GRINDING | C15 | 2.3 | 1.1 | B | A | B | A |
| EXAMPLE 45 | A1 | CC | GRINDING | C16 | 2.3 | 1.1 | B | A | B | A |
| EXAMPLE 46 | A1 | CC | GRINDING | C17 | 2.1 | 0.7 | A | A | B | A |
| EXAMPLE 47 | A1 | CC | GRINDING | C18 | 3.0 | 2.0 | B | A | A | A |
| EXAMPLE 48 | A1 | CC | CUTTING + GRINDING | C1 | 1.9 | 0.6 | A | A | A | A |
| EXAMPLE 49 | A1 | CC | CUTTING + GRINDING | C2 | 1.5 | 1.2 | B | A | A | A |
| EXAMPLE 50 | A1 | CC | CUTTING + GRINDING | C3 | 2.6 | 1.3 | B | A | B | A |
| EXAMPLE 51 | A1 | CC | CUTTING + GRINDING | C4 | 2.4 | 1.2 | B | A | A | A |
| EXAMPLE 52 | A1 | CC | CUTTING + GRINDING | C5 | 2.1 | 0.9 | A | A | A | A |
| EXAMPLE 53 | A1 | CC | CUTTING + GRINDING | C6 | 2.3 | 1.3 | B | A | B | A |
| EXAMPLE 54 | A1 | CC | CUTTING + GRINDING | C7 | 3.1 | 1.3 | B | A | B | A |
| EXAMPLE 55 | A1 | CC | CUTTING + GRINDING | C8 | 2.0 | 0.9 | A | A | B | A |
| EXAMPLE 56 | A1 | CC | CUTTING + GRINDING | C9 | 2.9 | 1.2 | B | A | A | A |
| EXAMPLE 57 | A1 | CC | CUTTING + GRINDING | C10 | 2.2 | 0.7 | A | A | A | A |
| EXAMPLE 58 | A1 | CC | CUTTING + GRINDING | C11 | 2.0 | 1.3 | B | A | A | A |

TABLE 6-continued

| | ALLOY | CASTING | SURFACE PROCESSING | PROCE-DURE | WAVINESS MAXIMUM AMPLITUDE | | | STRENGTH | PLATING SMOOTH-NESS | FLUT-TERING CHAR-ACTER-ISTICS |
| | | | | | 0.4-5.0 mm | 0.08-0.45 mm | EVALU-ATION | | | |
|---|---|---|---|---|---|---|---|---|---|---|
| EXAMPLE 59 | A1 | CC | CUTTING + GRINDING | C12 | 2.8 | 1.4 | B | A | B | A |
| EXAMPLE 60 | A1 | CC | CUTTING + GRINDING | C13 | 2.5 | 1.6 | B | A | A | A |
| EXAMPLE 61 | A1 | CC | CUTTING + GRINDING | C14 | 1.9 | 0.8 | A | A | A | A |
| EXAMPLE 62 | A1 | CC | CUTTING + GRINDING | C15 | 2.4 | 1.0 | B | A | B | A |
| EXAMPLE 63 | A1 | CC | CUTTING + GRINDING | C16 | 2.3 | 0.8 | B | A | B | A |
| EXAMPLE 64 | A1 | CC | CUTTING + GRINDING | C17 | 2.0 | 0.7 | A | A | B | A |
| EXAMPLE 65 | A1 | CC | CUTTING + GRINDING | C18 | 2.9 | 2.2 | B | A | A | A |

TABLE 7

| | ALLOY | CASTING | SURFACE PROCESSING | PROCE-DURE | WAVINESS MAXIMUM AMPLITUDE | | | STRENGTH | PLATING SMOOTH-NESS | FLUT-TERING CHAR-ACTER-ISTICS |
| | | | | | 0.4-5.0 mm | 0.08-0.45 mm | EVALU-ATION | | | |
|---|---|---|---|---|---|---|---|---|---|---|
| COMPARATIVE EXAMPLE 20 | A1 | CC | GRINDING | D1 | 2.3 | 1.2 | B | A | C | A |
| COMPARATIVE EXAMPLE 21 | A1 | CC | GRINDING | D2 | 5.3 | 2.0 | C | A | C | A |
| COMPARATIVE EXAMPLE 22 | A1 | CC | GRINDING | D3 | 2.4 | 1.3 | B | A | C | A |
| COMPARATIVE EXAMPLE 23 | A1 | CC | GRINDING | D4 | 2.6 | 1.4 | B | A | C | A |
| COMPARATIVE EXAMPLE 24 | A1 | CC | GRINDING | D5 | 4.2 | 2.1 | C | A | C | A |
| COMPARATIVE EXAMPLE 25 | A1 | CC | GRINDING | D6 | 6.3 | 2.4 | C | A | C | A |
| COMPARATIVE EXAMPLE 26 | A1 | CC | GRINDING | D7 | 2.5 | 1.6 | C | A | C | A |
| COMPARATIVE EXAMPLE 27 | A1 | CC | GRINDING | D8 | 5.8 | 1.8 | C | A | C | A |
| COMPARATIVE EXAMPLE 28 | A1 | CC | GRINDING | D9 | 2.3 | 1.4 | B | A | C | A |
| COMPARATIVE EXAMPLE 29 | A1 | CC | GRINDING | D10 | 5.3 | 2.0 | C | A | C | A |
| COMPARATIVE EXAMPLE 30 | A1 | CC | GRINDING | D11 | 2.3 | 1.1 | B | A | C | A |
| COMPARATIVE EXAMPLE 31 | A1 | CC | GRINDING | D12 | 2.5 | 1.2 | B | A | C | A |
| COMPARATIVE EXAMPLE 32 | A1 | CC | GRINDING | D13 | 3.7 | 2.3 | C | A | C | A |
| COMPARATIVE EXAMPLE 33 | A1 | CC | GRINDING | D14 | 6.4 | 2.2 | C | A | C | A |
| COMPARATIVE EXAMPLE 34 | A1 | CC | GRINDING | D15 | 2.4 | 1.7 | C | A | C | A |
| COMPARATIVE EXAMPLE 35 | A1 | CC | GRINDING | D16 | 6.0 | 1.7 | C | A | C | A |
| COMPARATIVE EXAMPLE 36 | A1 | CC | GRINDING | D17 | 6.0 | 3.0 | C | A | C | A |
| COMPARATIVE EXAMPLE 37 | A1 | CC | CUTTING + GRINDING | D1 | 2.1 | 1.2 | B | A | C | A |
| COMPARATIVE EXAMPLE 38 | A1 | CC | CUTTING + GRINDING | D2 | 5.0 | 1.9 | C | A | C | A |
| COMPARATIVE EXAMPLE 39 | A1 | CC | CUTTING + GRINDING | D3 | 2.2 | 1.4 | B | A | C | A |
| COMPARATIVE EXAMPLE 40 | A1 | CC | CUTTING + GRINDING | D4 | 2.7 | 1.5 | B | A | C | A |
| COMPARATIVE EXAMPLE 41 | A1 | CC | CUTTING + GRINDING | D5 | 4.4 | 2.4 | C | A | C | A |
| COMPARATIVE EXAMPLE 42 | A1 | CC | CUTTING + GRINDING | D6 | 6.1 | 2.4 | C | A | C | A |

TABLE 7-continued

| | ALLOY | CASTING | SURFACE PROCESSING | PROCEDURE | WAVINESS MAXIMUM AMPLITUDE | | | STRENGTH | PLATING SMOOTHNESS | FLUTTERING CHARACTERISTICS |
| --- | --- | --- | --- | --- | --- | --- | --- | --- | --- | --- |
| | | | | | 0.4-5.0 mm | 0.08-0.45 mm | EVALUATION | | | |
| COMPARATIVE EXAMPLE 43 | A1 | CC | CUTTING + GRINDING | D7 | 3.0 | 2.0 | C | A | C | A |
| COMPARATIVE EXAMPLE 44 | A1 | CC | CUTTING + GRINDING | D8 | 5.2 | 1.6 | C | A | C | A |
| COMPARATIVE EXAMPLE 45 | A1 | CC | CUTTING + GRINDING | D9 | 2.5 | 1.2 | B | A | C | A |
| COMPARATIVE EXAMPLE 46 | A1 | CC | CUTTING + GRINDING | D10 | 5.4 | 1.8 | C | A | C | A |
| COMPARATIVE EXAMPLE 47 | A1 | CC | CUTTING + GRINDING | D11 | 2.3 | 1.1 | B | A | C | A |
| COMPARATIVE EXAMPLE 48 | A1 | CC | CUTTING + GRINDING | D12 | 2.3 | 1.1 | B | A | C | A |
| COMPARATIVE EXAMPLE 49 | A1 | CC | CUTTING + GRINDING | D13 | 4.0 | 2.2 | C | A | C | A |
| COMPARATIVE EXAMPLE 50 | A1 | CC | CUTTING + GRINDING | D14 | 6.0 | 1.8 | C | A | C | A |
| COMPARATIVE EXAMPLE 51 | A1 | CC | CUTTING + GRINDING | D15 | 2.5 | 1.7 | C | A | C | A |
| COMPARATIVE EXAMPLE 52 | A1 | CC | CUTTING + GRINDING | D16 | 5.7 | 1.7 | C | A | C | A |
| COMPARATIVE EXAMPLE 53 | A1 | CC | CUTTING + GRINDING | D17 | 6.1 | 2.8 | C | A | C | A |
| COMPARATIVE EXAMPLE 54 | A1 | CC | CUTTING | C1 | 6.5 | 3.0 | C | A | C | A |
| COMPARATIVE EXAMPLE 55 | A1 | CC | — | C1 | 9.3 | 4.0 | C | A | C | A |
| COMPARATIVE EXAMPLE 56 | A1 | CC | CUTTING | C10 | 5.7 | 3.0 | C | A | C | A |
| COMPARATIVE EXAMPLE 57 | A1 | CC | — | C10 | 9.2 | 3.7 | C | A | C | A |
| COMPARATIVE EXAMPLE 58 | A1 | DC | GRINDING | C1 | 1.2 | 0.3 | A | C | A | A |
| COMPARATIVE EXAMPLE 59 | A1 | DC | GRINDING | C10 | 1.4 | 0.2 | A | C | A | A |

Examples 31 to 65, which were fabricated based on the aluminum alloy (Alloy A1) having a preferable composition by preferable procedures (in particular, preferable compound removal process), were evaluated as acceptable regarding plating smoothness and fluttering characteristics.

In contrast, the aluminum alloy substrates of Comparative Examples 20 to 59 were evaluated as unacceptable regarding any of the properties due to their fabrication processes or conditions, despite of the preferable alloy composition.

Comparative Examples 20, 28, 37, and 45 were evaluated as unacceptable regarding plating smoothness. The poor plating smoothness was caused by deficiencies on the plated surface, which were generated because of incomplete removal of compound particles due to the low HF concentration of the solution used in the compound removal process.

Comparative Examples 21, 29, 38, and 46 were evaluated as unacceptable regarding plating smoothness. The poor plating smoothness was caused by deficiencies on the plated surface resulting from a number of irregularities, which were generated because the substrate was severely dissolved due to the excessively high HF concentration of the solution used in the compound removal process. The poor plating smoothness resulted in a high level of waviness.

Comparative Examples 22, 30, 39, and 47 were evaluated as unacceptable regarding plating smoothness. The poor plating smoothness was caused by deficiencies on the plated surface, which were generated because of incomplete removal of compound particles due to the low $HNO_3$ concentration of the solution used in the compound removal process.

Comparative Examples 23, 31, 40, and 48 were evaluated as unacceptable regarding plating smoothness. The poor plating smoothness was caused by deficiencies on the plated surface, which were generated because of incomplete removal of compound particles due to the excessively high $HNO_3$ concentration of the solution used in the compound removal process.

Comparative Examples 24, 32, 41, and 49 were evaluated as unacceptable regarding plating smoothness. The poor plating smoothness was caused by deficiencies on the plated surface, which were generated because of incomplete removal of compound particles due to a low rate of reaction resulting from a low temperature of the solution used in the compound removal process. The poor plating smoothness resulted in a high level of waviness.

Comparative Examples 25, 33, 42, and 50 were evaluated as unacceptable regarding plating smoothness. The poor plating smoothness was caused by a number of irregularities, which were generated because the substrate was severely dissolved due to the high temperature of the solution used in the compound removal process. The poor plating smoothness resulted in a high level of waviness.

Comparative Examples 26, 34, 43, and 51 were evaluated as unacceptable regarding plating smoothness. The poor plating smoothness was caused by deficiencies on the plated surface, which were generated because of incomplete removal of compound particles due to the insufficient reaction time resulting from the short compound removal process. The poor plating smoothness resulted in a high level of waviness.

Comparative Examples 27, 35, 44, and 52 were evaluated as unacceptable regarding plating smoothness. The poor plating smoothness was caused by a number of irregularities, which were generated because the substrate was severely dissolved due to the excessive reaction resulting from the long compound removal process. The poor plating smoothness resulted in a high level of waviness.

Comparative Examples 36 and 53 were evaluated as unacceptable regarding plating smoothness. The poor plating smoothness was caused by deficiencies on the plated surface, which were generated because of incomplete removal of compound particles by an existing electroless Ni—P plating process without the compound removal process. The poor plating smoothness resulted in a high level of waviness.

Comparative Examples 54 and 56 were evaluated as unacceptable due to a high level of waviness, because the surface processing involved only cutting.

Comparative Examples 55 and 57 were evaluated as unacceptable due to a high level of waviness, because no surface processing was conducted.

Comparative Examples 58 and 59 were evaluated as unacceptable because the substrates were fabricated by the DC method and thus deformed during operation due to the low strength.

INDUSTRIAL APPLICABILITY

The disclosure provides an aluminum alloy substrate having a low level of surface waviness, causing a low level of disk fluttering, and having reduced deficiencies on the electroless Ni—P plated surface. This configuration can achieve a thickness reduction of a magnetic disk, leading to an increase in the number of installable magnetic disks, achieve an expansion of the capacity of each magnetic disk, and achieve an increase in speed of reading and writing operations. This magnetic disk can contribute to enhancement of the capacity and speed of an HDD.

The invention claimed is:

1. An aluminum alloy substrate for a magnetic disk, the substrate comprising:
    an aluminum alloy provided with electroless Ni—P plating, wherein
    the aluminum alloy comprises 0.4 to 3.0 mass % of Fe, 0.1 to 3.0 mass % of Mn, 0.005 to 1.0 mass % of Cu, and 0.005 to 1.0 mass % of Zn, with a balance of Al and unavoidable impurities,
    a maximum amplitude of waviness in a wavelength range of 0.4 to 5.0 mm is 5.0 nm or less, and a maximum amplitude of waviness in a wavelength range of 0.08 to 0.45 mm is 1.5 nm or less on a surface of the aluminum alloy substrate, and
    a yield stress after retention at 300° C. for three hours is 100 MPa or more.

2. The aluminum alloy substrate for a magnetic disk according to claim 1, wherein the aluminum alloy further comprises one or more elements selected from a group comprising 0.1 to 0.4 mass % of Si, 0.1 to 3.0 mass % of Ni, 0.01 to 1.00 mass % of Cr, and 0.01 to 1.00 mass % of Zr.

3. The aluminum alloy substrate for a magnetic disk according to claim 1, wherein the aluminum alloy further comprises one or more elements selected from a group comprising Ti, B, and V at a total content of 0.005 to 0.5 mass %.

4. A method of fabricating an aluminum alloy substrate for a magnetic disk, the method being applied to the aluminum alloy substrate according to claim 1, the method comprising:
    a casting process to produce an aluminum alloy cast plate;
    a rolling process of cold rolling the aluminum alloy cast plate to produce an aluminum alloy plate;
    a pressure annealing process of extracting an annular aluminum alloy plate from the aluminum alloy plate and annealing and flattening the annular aluminum alloy plate under a pressure;
    a substrate preparing process comprising a grinding step and a stress-relieving heat treatment step in an order mentioned, the substrate preparing process being directed to the annular aluminum alloy plate after the pressure annealing process;
    a plating pretreatment process comprising an alkaline degreasing step, an acid etching step, and at least one zincate treatment step in an order mentioned, the plating pretreatment process being directed to the annular aluminum alloy plate after the substrate preparing process; and
    an electroless Ni—P plating process of providing electroless Ni—P plating to a surface of the annular aluminum alloy plate after the plating pretreatment process, wherein
    the method further comprises a compound removal process at a timing after the grinding step of the substrate preparing process and before a first one of the at least one zincate treatment step of the plating pretreatment process,
    the casting process involves continuous casting to produce the aluminum alloy cast plate, and
    the compound removal process involves immersion of the annular aluminum alloy plate for 5 to 60 seconds into an $HNO_3$/HF mixed solution, the mixed solution being a solution at a temperature of 10° C. to 30° C. having an $HNO_3$ concentration of 10 to 60 mass % and an HF concentration of 10 to 80 g/L.

5. The method of fabricating an aluminum alloy substrate for a magnetic disk according to claim 4, further comprising a cutting step before the grinding step of the substrate preparing process.

6. A magnetic disk comprising
    a magnetic medium that is disposed on the aluminum alloy substrate for a magnetic disk according to claim 1 and comprises magnetic layer,
    wherein, a maximum amplitude of waviness in a wavelength range of 0.4 to 5.0 mm is 5.0 nm or less, and a maximum amplitude of waviness in a wavelength range of 0.08 to 0.45 mm is 1.5 nm or less on a surface of the magnetic disk.

* * * * *